United States Patent
Liu et al.

(10) Patent No.: US 9,766,432 B2
(45) Date of Patent: *Sep. 19, 2017

(54) OPTICAL IMAGE CAPTURING SYSTEM

(71) Applicant: ABILITY OPTO-ELECTRONICS TECHNOLOGY CO., LTD., Taichung (TW)

(72) Inventors: Yao-Wei Liu, Taichung (TW); Yeong-Ming Chang, Taichung (TW)

(73) Assignee: ABILITY OPTO-ELECTRONICS TECHNOLOGY CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,009

(22) Filed: Aug. 3, 2015

(65) Prior Publication Data

US 2016/0212310 A1    Jul. 21, 2016

(30) Foreign Application Priority Data

Jan. 21, 2015  (TW) .............................. 104101985 A

(51) Int. Cl.
| | | |
|---|---|---|
| *G02B 13/00* | (2006.01) | |
| *G02B 9/14* | (2006.01) | |
| *G02B 9/16* | (2006.01) | |
| *H04N 5/225* | (2006.01) | |

(52) U.S. Cl.
CPC ........... *G02B 13/0035* (2013.01); *G02B 9/14* (2013.01); *G02B 9/16* (2013.01); *G02B 13/001* (2013.01); *G02B 13/002* (2013.01); *H04N 5/2254* (2013.01)

(58) Field of Classification Search
CPC .............. G02B 13/0035; G02B 13/001; G02B 13/002; G02B 9/12; G02B 9/14; G02B 9/16
USPC .................... 359/716, 784–785, 789–792
See application file for complete search history.

(56) References Cited

U.S. PATENT DOCUMENTS

| | | | |
|---|---|---|---|
| 2012/0050888 A1 | 3/2012 | Dai et al. | |
| 2016/0161707 A1* | 6/2016 | Liao ..................... | G02B 13/004 348/360 |
| 2016/0161710 A1* | 6/2016 | Liao ................... | G02B 13/0015 348/360 |

(Continued)

FOREIGN PATENT DOCUMENTS

WO    2013008862 A1    1/2013

OTHER PUBLICATIONS

Examination Report of TW104101985, Issued on Feb. 17, 2016, Total of 12 pages.

(Continued)

*Primary Examiner* — Jordan Schwartz
(74) *Attorney, Agent, or Firm* — Lynette Wylie; Apex Juris, pllc.

(57) ABSTRACT

A three-piece optical lens for capturing image and a three-piece optical module for capturing image, along the optical axis in order from an object side to an image side, include a first lens with positive refractive power; a second lens with refractive power; and a third lens with refractive power; and at least one of the image-side surface and object-side surface of each of the three lens elements are aspheric. The optical lens can increase aperture value and improve the imaging quality for use in compact cameras.

21 Claims, 12 Drawing Sheets

(56) References Cited

U.S. PATENT DOCUMENTS

2016/0161711 A1* 6/2016 Liao .................. G02B 13/0015
348/360

OTHER PUBLICATIONS

Search Report of TW104101985, Issued on Feb. 15, 2016, Total of 1 pages.

* cited by examiner

OPTICAL IMAGE CAPTURING SYSTEM

BACKGROUND OF THE INVENTION

1. Technical Field

The present invention relates generally to an optical system, and more particularly to a compact optical image capturing system for an electronic device.

2. Description of Related Art

In recent years, with the rise of portable electronic devices having camera functionalities, there is an increasing demand for an optical image capturing system. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system towards the field of high pixels. Therefore, the requirement for high imaging quality is rapidly rising.

The conventional optical system of the portable electronic device usually has a two-piece lens. However, to take pictures in a dark environment, the optical system needs a large aperture. An optical system with large aperture typically has several problems, such as, large aberration, poor image quality at periphery of the image, and is burdensome to manufacture. In addition, a wide-angle optical system usually has large distortion. Therefore, conventional optical system do not provide high optical performance in these environments.

There is a need to increase the quantity of light entering the lens and the angle of field of the lens. In addition, the modern lens also needs improved properties, including high pixels, high image quality, a small size, and high optical performance.

BRIEF SUMMARY OF THE INVENTION

The aspect of embodiment of the present disclosure directs to an optical image capturing system and an optical image capturing lens which use combination of refractive powers, convex and concave surfaces of three-piece optical lenses (the convex or concave surface in the disclosure denotes the geometrical shape of an image-side surface or an object-side surface of each lens on an optical axis) to increase the quantity of incoming light of the optical image capturing system, and to improve imaging quality for image formation, so as to be applied to minimized electronic products.

The terms' definitions relate to the lens parameter in the embodiment of the present invention are provided below for further reference.

The lens parameter is related to a length or a height in the lens:

A height for image formation of the optical image capturing system is denoted by HOI. A height of the optical image capturing system is denoted by HOS. A distance from the object-side surface of the first lens to the image-side surface of the third lens is denoted by InTL. A distance from the image-side surface of the third lens to the image plane is denoted by InB. InTL+InB=HOS. A distance from the first lens to the second lens is denoted by IN12 (instance). A central thickness of the first lens of the optical image capturing system on the optical axis is denoted by TP1 (instance).

The lens parameter related to a material in the lens:

An Abbe number of the first lens in the optical image capturing system is denoted by NA1 (instance). A refractive index of the first lens is denoted by Nd1 (instance).

The lens parameter related to a view angle in the lens:

A view angle is denoted by AF. Half of the view angle is denoted by HAF. A major light angle is denoted by MRA.

The lens parameter related to exit/entrance pupil in the lens

An entrance pupil diameter of the optical image capturing system is denoted by HEP.

The lens parameter related to a depth of the lens shape

A distance from a point on the object-side surface of the third lens passed through by the optical axis to a point on the optical axis where a projection of a maximum effective semi diameter of the object-side surface of the third lens ends is denoted by InRS31 (instance). A distance from a point on the image-side surface of the third lens passed through by the optical axis to a point on the optical axis where a projection of a maximum effective semi diameter of the image-side surface of the third lens ends is denoted by InRS32.

The lens parameter related to the lens shape:

A critical point C is a tangent point on a surface of a specific lens, and the tangent point is tangent to a plane perpendicular to the optical axis and the tangent point cannot be a crossover point on the optical axis. To follow the past, a distance perpendicular to the optical axis between a critical point C21 on the object-side surface of the second lens and the optical axis is HVT21 (instance). A distance perpendicular to the optical axis between a critical point C31 on the object-side surface of the third lens and the optical axis is HVT31 (instance). A distance perpendicular to the optical axis between a critical point C32 on the image-side surface of the third lens and the optical axis is HVT32 (instance). The object-side surface of the third lens has one inflection point IF311 which is nearest to the optical axis, and the sinkage value of the inflection point IF311 is denoted by SGI311. A distance perpendicular to the optical axis between the inflection point IF311 and the optical axis is HIF311 (instance). The image-side surface of the third lens has one inflection point IF321 which is nearest to the optical axis, and the sinkage value of the inflection point IF321 is denoted by SGI321 (instance). A distance perpendicular to the optical axis between the inflection point IF321 and the optical axis is HIF321 (instance). The object-side surface of the third lens has one inflection point IF312 which is the second nearest to the optical axis, and the sinkage value of the inflection point IF312 is denoted by SGI312 (instance). A distance perpendicular to the optical axis between the inflection point IF312 and the optical axis is HIF312 (instance). The image-side surface of the third lens has one inflection point IF322 which is the second nearest to the optical axis, and the sinkage value of the inflection point IF322 is denoted by SGI322 (instance). A distance perpendicular to the optical axis between the inflection point IF322 and the optical axis is HIF322 (instance).

The lens parameter related to an aberration:

Optical distortion for image formation in the optical image capturing system is denoted by ODT. TV distortion for image formation in the optical image capturing system is denoted by TDT. Further, the range of the aberration offset for the view of image formation may be limited to 50%-100% field. An offset of the spherical aberration is denoted by DFS. An offset of the coma aberration is denoted by DFC.

The present invention provides an optical image capturing system, in which the third lens is provided with an inflection point at the object-side surface or at the image-side surface to adjust the incident angle of each view field and modify the ODT and the TDT. In addition, the surfaces of the third lens are capable of modifying the optical path to improve the imaging quality.

The optical image capturing system of the present invention includes a first lens, a second lens, and a third lens, in order along an optical axis from an object side to an image side. The first lens has positive refractive power, and the third lens has refractive power. At least two of the three lenses each has at least an inflection point on a surface thereof. Both the object-side surface and the image-side surface of the third lens are aspheric surfaces. The optical image capturing system satisfies:

$$1.2 \leq f/HEP \leq 6.0;\ 0.5 \leq HOS/f \leq 3.0;\ 0 < \Sigma|InRS|/InTL \leq 3$$

where f is a focal length of the optical image capturing system; HEP is an entrance pupil diameter of the optical image capturing system; HOS is a distance in parallel with the optical axis between an object-side surface, which face the object side, of the first lens and the image plane; InTL is a distance between the object-side surface of the first lens and the image-side surface of the third lens; and $\Sigma|InRS|$ is of an sum of absolute values of the displacements in parallel with the optical axis of each lens with refractive power from the central point to the point at the maximum effective semi diameter, i.e. $\Sigma|InRS|=InRSO+InRSI$ while InRSO is of a sum of absolute values of the displacements in parallel with the optical axis of each lens with refractive power from the central point on the object-side surface to the point at the maximum effective semi diameter of the object-side surface and InRSI is of a sum of absolute values of the displacements in parallel with the optical axis of each lens with refractive power from the central point on the image-side surface to the point at the maximum effective semi diameter of the image-side surface.

The present invention further provides an optical image capturing system, including a first lens, a second lens, and a third lens in order along an optical axis from an object side to an image side. The first lens has positive refractive power, and both the object-side surface and the image side surface thereof are aspheric surfaces. The second lens has refractive power, and has at least an inflection point on a surface thereof. The third lens has at least an inflection point on a surface thereof, and both the object-side surface and the image side surface thereof are aspheric surfaces. The optical image capturing system satisfies:

$$1.2 \leq f/HEP \leq 6.0;\ 0.5 \leq HOS/f \leq 3.0;\ 0 < \Sigma|InRS|/InTL \leq 3;\ |TDT|<60\%;\ \text{and}\ |ODT| \leq 50\%;$$

where f is a focal length of the optical image capturing system; HEP is an entrance pupil diameter of the optical image capturing system; HOS is a distance in parallel with the optical axis between an object-side surface, which face the object side, of the first lens and the image plane; HAF is a half of the view angle of the optical image capturing system; TDT is a TV distortion; ODT is an optical distortion; InTL is a distance between the object-side surface of the first lens and the image-side surface of the third lens; and $\Sigma|InRS|$ is a sum of absolute values of a displacement for each lens with refractive power from a central point passed through by the optical axis to a the maximum effective semi diameter ends, i.e. $\Sigma|InRS|=InRSO+InRSI$ while InRSO is a sum of absolute value of the displacement for each lens with refractive power from the central point on the object-side surface passed through by the optical axis to the point on the optical axis where the projection of the maximum effective semi diameter of the object-side surface ends, and InRSI is a sum of absolute value of the displacement for each lens with refractive power from the central point on the image-side surface passed through by the optical axis to the point on the optical axis where the projection of the maximum effective semi diameter of the image-side surface ends.

The present invention further provides an optical image capturing system, including a first lens, a second lens, and a third lens, in order along an optical axis from an object side to an image side. The first lens has positive refractive power, and both an object-side surface and an image side surface thereof each has at least an inflection point. The second lens has negative refractive power, and at least an object-side surface and an image side surface thereof each has at least an inflection point. The third lens has refractive power, and at least an object-side surface and an image side surface thereof each has at least an inflection point. The optical image capturing system satisfies:

$$1.2 \leq f/HEP \leq 6.0;\ 0.4 \leq |\tan(HAF)| \leq 3.0;\ 0.5 \leq HOS/f \leq 3.0;\ |TDT|<60\%;\ |ODT| \leq 50\%;\ \text{and}\ 0 < \Sigma|InRS|/InTL \leq 3;$$

where f is a focal length of the optical image capturing system; HEP is an entrance pupil diameter of the optical image capturing system; HOS is a distance in parallel with the optical axis between an object-side surface, which face the object side, of the first lens and the image plane; HAF is a half of the view angle of the optical image capturing system; TDT is a TV distortion; and ODT is an optical distortion; InTL is a distance between the object-side surface of the first lens and the image-side surface of the third lens; and $\Sigma|InRS|$ is of a sum of absolute values of a displacement for each lens with refractive power from a central point passed through by the optical axis to a point on the optical axis where a projection of the maximum effective semi diameter ends, i.e. $\Sigma|InRS|=InRSO+InRSI$ while InRSO is a sum of absolute value of the displacement for each lens with refractive power from the central point on the object-side surface passed through by the optical axis to the point on the optical axis where the projection of the maximum effective semi diameter of the object-side surface ends, and InRSI is a sum of absolute value of the displacement for each lens with refractive power from the central point on the image-side surface passed through by the optical axis to the point on the optical axis where the projection of the maximum effective semi diameter of the image-side surface ends.

In an embodiment, the optical image capturing system further includes an image sensor with a size less than 1/1.2" in diagonal, a preferred size is 1/2.3", and a pixel less than 1.4 μm. A preferable pixel size of the image sensor is less than 1.12 μm, and more preferable pixel size is less than 0.9 μm. A 16:9 image sensor is available for the optical image capturing system of the present invention.

In an embodiment, the optical image capturing system of the present invention is available to a million pixels or higher recording, and provides high quality of image.

In an embodiment, a height of the optical image capturing system (HOS) can be reduced while $|f1|>f3$.

In an embodiment, when the lenses satisfy $|f2|>|f1|$, the second lens could have weak positive refractive power or weak negative refractive power. When the second lens has weak positive refractive power, it may share the positive refractive power of the first lens, and on the contrary, when the second lens has weak negative refractive power, it may finely modify the aberration of the system.

In an embodiment, the third lens could have positive refractive power, and an image-side surface thereof is concave, it may reduce back focal length and size. Besides, the third lens could have at least an inflection point on a surface thereof, which may reduce an incident angle of the light of an off-axis field of view and modify the aberration of the off-axis field of view. It is preferable that both surfaces of the third lens have at least an inflection point on a surface thereof.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
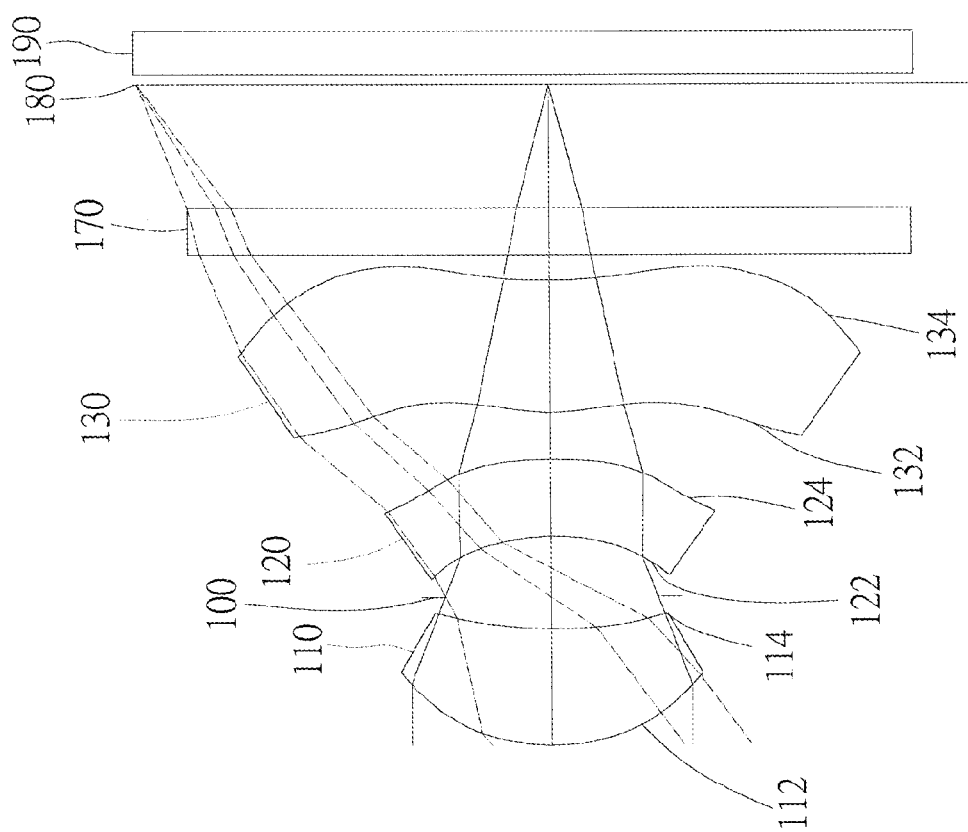
FIG. 1A is a schematic diagram of a first preferred embodiment of the present invention.
Figure 1:
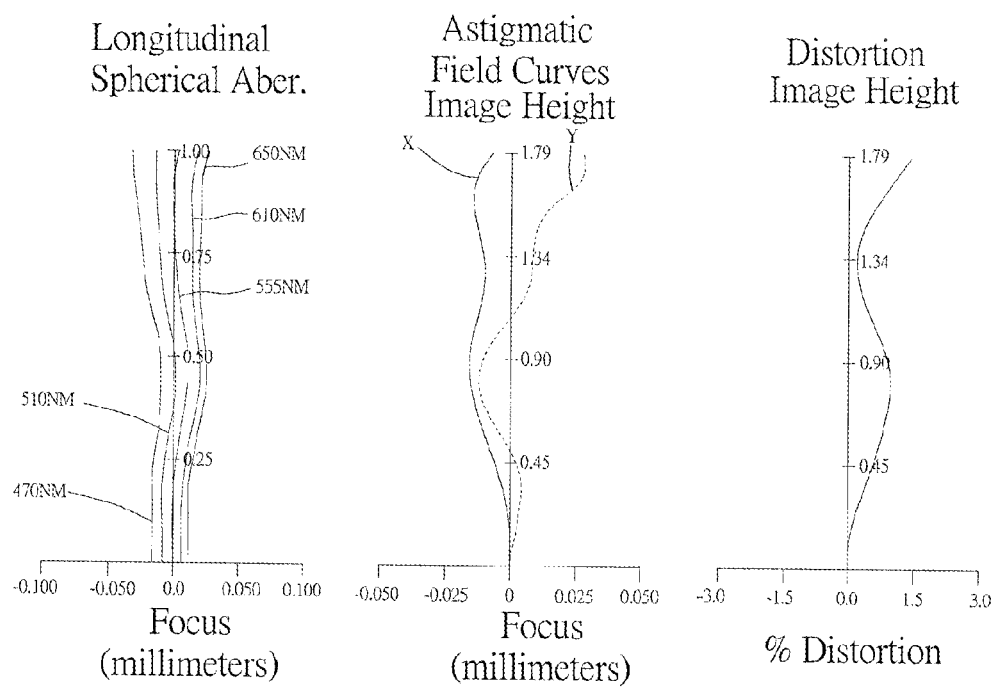
FIG. 1B shows curve diagrams of longitudinal spherical aberration, astigmatic field, and optical distortion of the optical image capturing system in the order from left to right of the first embodiment of the present application.
FIG. 1C shows a curve diagram of TV distortion of the optical image capturing system of the first embodiment of the present application.
Figure 1:
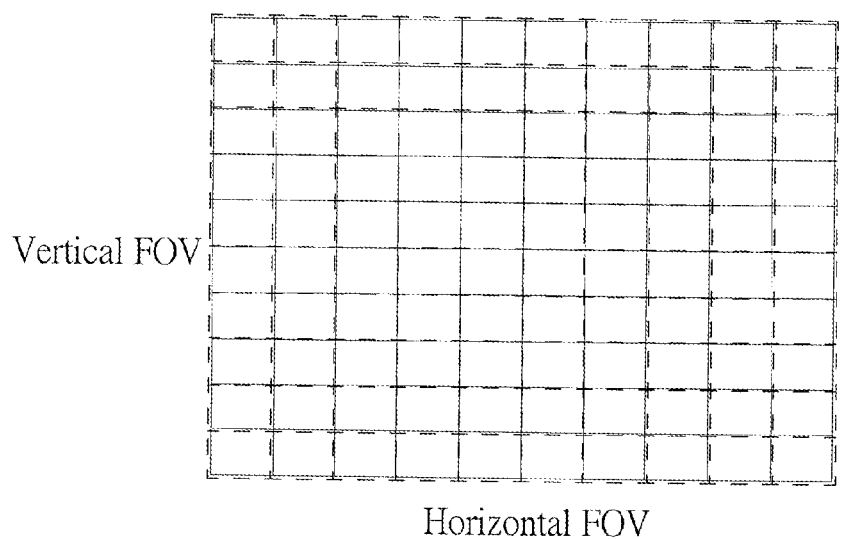

An optical image capturing system of the present invention includes a first lens, a second lens, and a third lens from an object side to an image side. The optical image capturing system further is provided with an image sensor at an image plane.

The optical image capturing system works in three wavelengths, including 486.1 nm, 587.5 nm, 555 nm, and 656.2 nm, wherein 587.5 nm is the main reference wavelength, and 555 nm is the reference wavelength for obtaining the technical characters.

The optical image capturing system of the present invention satisfies $0.5 \leq \Sigma PPR/|\Sigma NPR| \leq 4.5$, and a preferable range is $1 \leq \Sigma PPR/|\Sigma NPR| \leq 3.8$, where PPR is a ratio of the focal length f of the optical image capturing system to a focal length fp of each of lenses with positive refractive power; NPR is a ratio of the focal length f of the optical image capturing system to a focal length fn of each of lenses with negative refractive power; and ENPR is a sum of the PNRs of each negative lens. It is helpful to control of an entire refractive power and an entire length of the optical image capturing system.

HOS is a height of the optical image capturing system, and when the ratio of HOS/f approaches to 1, it is helpful for decrease of size and increase of imaging quality.

In an embodiment, the optical image capturing system of the present invention satisfies $0 < \Sigma PP \leq 200$ and $f1/\Sigma PP \leq 0.85$, and a preferable range is $0 < \Sigma PP \leq 150$ and $0.01 \leq f1/\Sigma PP \leq 0.6$, where $\Sigma PP$ is a sum of a focal length fp of each lens with positive refractive power, and $\Sigma NP$ is a sum of a focal length fp of each lens with negative refractive power. It is helpful to control of focusing capacity of the system and redistribution of the positive refractive powers of the system to avoid the significant aberration in early time.

The first lens has positive refractive power, and an object-side surface, which faces the object side, thereof is convex. It may modify the positive refractive power of the first lens as well as shorten the entire length of the system.

The second lens has negative refractive power, which may correct the aberration of the first lens.

The third lens has positive refractive power, and an image-side surface, which faces the image side, thereof is concave. It may share the positive refractive power of the first lens and shorten the back focal length to keep the system miniaturized. Besides, the third lens has at least an inflection point on at least a surface thereof to reduce the incident angle of the off-axis view angle light. Preferable, both the object-side surface and the image-side surface each has at least an inflection point.

The image sensor is provided on the image plane. The optical image capturing system of the present invention satisfies $HOS/HOI \leq 3$ and $0.5 \leq HOS/f \leq 3.0$, and a preferable range is $1 \leq HOS/HOI \leq 2.5$ and $1 \leq HOS/f \leq 2$, where HOI is height for image formation of the optical image capturing system, i.e., the maximum image height, and HOS is a height of the optical image capturing system, i.e. a distance on the optical axis between the object-side surface of the first lens and the image plane. It is helpful to reduction of size of the system for used in compact cameras.

The optical image capturing system of the present invention further is provided with an aperture to increase image quality.

In the optical image capturing system of the present invention, the aperture could be a front aperture or a middle aperture, wherein the front aperture is provided between the object and the first lens, and the middle is provided between the first lens and the image plane. The front aperture provides a long distance between an exit pupil of the system and the image plane, which allows more elements to be installed. The middle could enlarge a view angle of view of the system and increase the efficiency of the image sensor. The optical image capturing system satisfies 0.5≤InS/HOS≤1.1, and a preferable range is 0.6≤InS/HOS≤1, where InS is a distance between the aperture and the image plane. It is helpful to size reduction and wide angle.

The optical image capturing system of the present invention satisfies 0.45≤ΣTP/InTL≤0.95, where InTL is a distance between the object-side surface of the first lens and the image-side surface of the third lens, and ΣTP is a sum of central thicknesses of the lenses on the optical axis. It is helpful to the contrast of image and yield rate of manufacture, and provides a suitable back focal length for installation of other elements.

The optical image capturing system of the present invention satisfies 0.1≤|R1/R2|≤3.0, and a preferable range is 0.1≤|R1/R2|≤2.0, where R1 is a radius of curvature of the object-side surface of the first lens, and R2 is a radius of curvature of the image-side surface of the first lens. It provides the first lens with a suitable refractive power to reduce the increase rate of the spherical aberration.

The optical image capturing system of the present invention satisfies −200<(R5−R6)/(R5+R6)<30, where R5 is a radius of curvature of the object-side surface of the third lens, and R6 is a radius of curvature of the image-side surface of the third lens. It may modify the astigmatic field curvature.

The optical image capturing system of the present invention satisfies 0<IN12/f≤0.30, and a preferable range is 0.01≤IN12/f≤0.25, where IN12 is a distance on the optical axis between the first lens and the second lens. It may correct chromatic aberration and improve the performance.

The optical image capturing system of the present invention satisfies 1≤(TP1+IN12)/TP2≤10, where TP1 is a central thickness of the first lens on the optical axis, and TP2 is a central thickness of the second lens on the optical axis. It may control the sensitivity of manufacture of the system and improve the performance.

The optical image capturing system of the present invention satisfies 0.2≤(TP3+IN23)/TP2≤10, where TP2 is a central thickness of the second lens on the optical axis, TP3 is a central thickness of the third lens on the optical axis, and IN23 is a distance between the second lens and the third lens. It may control the sensitivity of manufacture of the system and improve the performance.

The optical image capturing system of the present invention satisfies 0.1≤TP2/ΣTP≤0.9, and a preferable range is 0.2≤TP2/ΣTP≤0.8, where TP2 is a central thickness of the second lens on the optical axis and ΣTP is a sum of the central thicknesses of all the lenses on the optical axis. It may finely modify the aberration of the incident rays and reduce the height of the system.

The optical image capturing system of the present invention satisfies 0 mm<|InRS11|+|InRS12|≤2 mm and 1.01≤(|InRS11|+TP1+|InRS12|)/TP1≤3, where InRS11 is a displacement from a point on the object-side surface of the first lens passed through by the optical axis, to a point on the optical axis where a projection of the maximum effective semi diameter of the object-side surface of the first lens ends, wherein InRS11 is positive while the displacement is toward the image side, and InRS11 is negative while the displacement is toward the object side; InRS12 is a displacement from a point on the image-side surface of the first lens passed through by the optical axis to a point on the optical axis where a projection of the maximum effective semi diameter of the image-side surface of the first lens ends; and TP1 is a central thickness of the first lens on the optical axis. It may control a ratio of the central thickness of the first lens and the effective semi diameter thickness (thickness ratio) to increase the yield rate of manufacture.

The optical image capturing system of the present invention satisfies 0 mm<|InRS21|+|InRS22|≤2 mm and 1.01≤(|InRS21|+TP2+|InRS22|)/TP2≤5, where InRS21 is a displacement from a point on the object-side surface of the second lens passed through by the optical axis, to a point on the optical axis where a projection of the maximum effective semi diameter of the object-side surface of the second lens ends; InRS22 is a displacement in parallel with the optical axis from a point on the image-side surface of the second lens, through which the optical axis passes, to a point at the maximum effective semi diameter of the image-side surface of the second lens; and TP2 is a central thickness of the second lens on the optical axis. It may control a ratio of the central thickness of the second lens and the effective semi diameter thickness (thickness ratio) to increase the yield rate of manufacture.

The optical image capturing system of the present invention satisfies 0<|InRS31|+|InRS32|≤2 mm and 1.01≤(|InRS31|+TP3+|InRS32|)/TP310, where InRS31 is a displacement from a point on the object-side surface 132 of the third lens passed through by the optical axis, to a point on the optical axis where a projection of the maximum effective semi diameter of the object-side surface of the third lens; InRS32 is a displacement in parallel with the optical axis from a point on the image-side surface of the third lens, through which the optical axis passes, to a point at the maximum effective semi diameter of the image-side surface of the third lens; and TP2 is a central thickness of the third lens on the optical axis. It may control a ratio of the central thickness of the third lens and the effective semi diameter thickness (thickness ratio) to increase the yield rate of manufacture.

The optical image capturing system of the present invention satisfies 0<Σ|InRS| 1.5 mm, where InRSO is a sum of absolute values of the displacement for each lens with refractive power from the central point on the object-side surface to the point at the maximum effective semi diameter of the object-side surface ends, i.e. InRSO=|InRS11|+|InRS21|+|InRS31|InRSI is a sum of absolute values of the displacement for each lens with refractive power from the central point on the image-side surface passed through by the optical axis to the point on the optical axis where the projection of the maximum effective semi diameter of the image-side surface ends, i.e. InRSI=|InRS12|+|InRS22|+|InRS32|. It may increase the capability of modifying the off-axis view field aberration of the system.

The optical image capturing system of the present invention satisfies 0<Σ|InRS|≤15 mm, where InRSO is of a sum of absolute values of the displacements in parallel with the optical axis of each lens with refractive power from the central point on the object-side surface to the point at the maximum effective semi diameter of the object-side surface, i.e. InRSO=|InRS11|+|InRS21|+|InRS31|; InRSI is of a sum of absolute values of the displacements in parallel with the optical axis of each lens with refractive power from the central point on the image-side surface to the point at the maximum effective semi diameter of the image-side surface, i.e. InRSI=|InRS12|+|InRS22|+|InRS32|; and Σ|InRS| is of an sum of absolute values of the displacements in parallel with the optical axis of each lens with refractive power from the central point to the point at the maximum effective semi diameter, i.e. Σ|InRS|=InRSO+InRSI. It may efficiently increase the capability of modifying the off-axis view field aberration of the system.

The optical image capturing system of the present invention satisfies 0<Σ|InRS|/InTL≤3 and 0<Σ|InRS|/HOS≤2. It may reduce the total height of the system and efficiently increase the capability of modifying the off-axis view field aberration of the system.

The optical image capturing system of the present invention satisfies 0<|InRS21|+|InRS22|+|InRS31|+|InRS32|≤8 mm; 0<(|InRS21|+|InRS22|+|InRS31|+|InRS32|)/InTL≤3; and 0<(|InRS21|+|InRS22|+|InRS31|+|InRS32|)/HOS≤2. It may efficiently increase the capability of modifying the off-axis view field aberration of the system.

The optical image capturing system of the first preferred embodiment satisfies HVT21≥0 mm and HVT22≥0 mm, where HVT21 a distance perpendicular to the optical axis between the inflection point on the object-side surface of the second lens and the optical axis; and HVT22 a distance perpendicular to the optical axis between the inflection point on the image-side surface of the second lens and the optical axis. It may efficiently modify the aberration of the off-axis view field of the system.

The optical image capturing system of the first preferred embodiment satisfies HVT31≥0 mm and HVT32≥0 mm, where HVT31 a distance perpendicular to the optical axis between the inflection point on the object-side surface of the third lens and the optical axis; and HVT32 a distance perpendicular to the optical axis between the inflection point on the image-side surface of the third lens and the optical axis. It may efficiently modify the aberration of the off-axis view field of the system.

The optical image capturing system of the first preferred embodiment satisfies 0.2≤HVT32/HOI≤0.9, and a preferred range is 0.3≤HVT32/HOI≤0.8. It may efficiently modify the aberration of the peripheral view field of the system.

The optical image capturing system of the first preferred embodiment satisfies 0≤HVT32/HOS≤0.5, and preferred range is 0.2≤HVT32/HOS≤0.45. It may efficiently modify the aberration of the peripheral view field of the system.

In an embodiment, the lenses of high Abbe number and the lenses of low Abbe number are arranged in an interlaced arrangement that could be helpful to correction of aberration of the system.

An equation of aspheric surface is $$z=ch^2/[1+[1(k+1)c^2h^2]^{0.5}]+A4h^4+A6h^6+A8h^8+A10h^{10}+A12h^{12}+A14h^{14}+A16h^{16}+A18h^{18}+A20h^{20} \quad (1)$$

where z is a depression of the aspheric surface; k is conic constant; c is reciprocal of radius of curvature; and A4, A6, A8, A10, A12, A14, A16, A18, and A20 are high-order aspheric coefficients.

In the optical image capturing system, the lenses could be made of plastic or glass. The plastic lenses may reduce the weight and lower the cost of the system, and the glass lenses may control the thermal effect and enlarge the space for arrangement of refractive power of the system. In addition, the opposite surfaces (object-side surface and image-side surface) of the first to the third lenses could be aspheric that can obtain more control parameters to reduce aberration. The number of aspheric glass lenses could be less than the conventional spherical glass lenses that is helpful to reduction of the height of the system.

When the lens has a convex surface, which means that the surface is convex around a position, through which the optical axis passes, and when the lens has a concave surface, which means that the surface is concave around a position, through which the optical axis passes.

The optical image capturing system of the present invention further is provided with a diaphragm to increase image quality.

In the optical image capturing system, the diaphragm could be a front diaphragm or a middle diaphragm, wherein the front diaphragm is provided between the object and the first lens, and the middle is provided between the first lens and the image plane. The front diaphragm provides a long distance between an exit pupil of the system and the image plane, which allows more elements to be installed. The middle diaphragm could enlarge a view angle of view of the system and increase the efficiency of the image sensor. The middle diaphragm is helpful to size reduction and wide angle.

The optical image capturing system of the present invention could be applied in dynamic focusing optical system. It is superior in correction of aberration and high imaging quality so that it could be allied in lots of fields.

We provide several embodiments in conjunction with the accompanying drawings for the best understanding, which are:

First Embodiment

As shown in FIG. 1A and FIG. 1B, an optical image capturing system 100 of the first preferred embodiment of the present invention includes, along an optical axis from an object side to an image side, a first lens 110, an aperture 100, a second lens 120, a third lens 130, an infrared rays filter 170, an image plane 180, and an image sensor 190.

The first lens 110 has positive refractive power, and is made of plastic. An object-side surface 112 thereof, which faces the object side, is a convex aspheric surface, and an image-side surface 114 thereof, which faces the image side, is a concave aspheric surface.

The second lens 120 has negative refractive power, and is made of plastic. An object-side surface 122 thereof, which faces the object side, is a concave aspheric surface, and an image-side surface 124 thereof, which faces the image side, is a convex aspheric surface, and the image-side surface 124 has an inflection point. The second lens 120 satisfies SGI221=−0.1526 mm and |SGI221|/(|SGI221|+TP2) =0.2292, where SGI221 is a displacement in parallel with the optical axis from a point on the image-side surface of the second lens, through which the optical axis passes, to the inflection point on the image-side surface, which is the closest to the optical axis.

The second lens further satisfies HIF221=0.5606 mm and HIF221/HOI=0.3128, where HIF221 is a displacement perpendicular to the optical axis from a point on the image-side surface of the second lens, through which the optical axis passes, to the inflection point, which is the closest to the optical axis.

The third lens 130 has positive refractive power, and is made of plastic. An object-side surface 132, which faces the object side, is a convex aspheric surface, and an image-side surface 134, which faces the image side, is a concave aspheric surface. The object-side surface 132 has two inflection points, and the image-side surface 134 has an inflection point. The third lens 130 satisfies SGI311=0.0180 mm; SGI321=0.0331 mm and |SGI311|/(|SGI311|+TP3)=0.0339 and |SGI321|/(|SGI321|+TP3)=0.0605, where SGI311 is a displacement in parallel with the optical axis, from a point on the object-side surface of the third lens, through which the optical axis passes, to the inflection point on the object-side surface, which is the closest to the optical axis, and SGI321 is a displacement in parallel with the optical axis, from a point on the image-side surface of the third lens, through which the optical axis passes, to the inflection point on the image-side surface, which is the closest to the optical axis.

The third lens 130 further satisfies SGI312=−0.0367 mm and |SGI312|/(|SGI312|+TP3)=0.0668, where SGI312 is a displacement in parallel with the optical axis, from a point on the object-side surface of the third lens, through which the optical axis passes, to the inflection point on the object-side surface, which is the second closest to the optical axis.

The third lens 130 further satisfies HIF311=0.2298 mm; HIF321=0.3393 mm; HIF311/HOI=0.1282; and HIF321/HOI=0.1893, where HIF311 is a distance perpendicular to the optical axis between the inflection point on the object-side surface of the third lens, which is the closest to the optical axis, and the optical axis, and HIF321 is a distance perpendicular to the optical axis between the inflection point on the image-side surface of the third lens, which is the closest to the optical axis, and the optical axis.

The third lens 130 further satisfies HIF312=0.8186 mm and HIF312/HOI=0.4568, where HIF312 is a distance perpendicular to the optical axis between the inflection point on the object-side surface of the third lens, which is the second closest to the optical axis, and the optical axis.

The infrared rays filter 170 is made of glass, and between the third lens 130 and the image plane 180. The infrared rays filter 170 gives no contribution to the focal length of the system.

The optical image capturing system of the first preferred embodiment has the following parameters, which are f=2.42952 mm; f/HEP=2.02; and HAF=35.87 degrees and tan(HAF)=0.7231, where f is a focal length of the system; HAF is a half of the maximum field angle; and HEP is an entrance pupil diameter.

The parameters of the lenses of the first preferred embodiment are f1=2.27233 mm; |f/f1|=1.06962; f3=−7.0647 mm; |f1|<f3; and |f1/f3|=0.3216, where f1 is a focal length of the first lens 110; and f3 is a focal length of the third lens 130.

The first preferred embodiment further satisfies f2=−5.2251 mm and |f2|>|f1|, where f2 is a focal length of the second lens 120 and f3 is a focal length of the third lens 130.

The optical image capturing system of the first preferred embodiment further satisfies ΣPPR=f/f1+f/f3=1.4131; ΣNPR=f/f2=0.4650; ΣPPR/|ΣNPR|=3.0391; |f/f3|=0.3439; |f1/f2|=0.4349; and |f2/f3|=0.7396, where PPR is a ratio of a focal length f of the optical image capturing system to a focal length fp of each of the lenses with positive refractive power; and NPR is a ratio of a focal length f of the optical image capturing system to a focal length fn of each of lenses with negative refractive power.

The optical image capturing system of the first preferred embodiment further satisfies InTL+InB=HOS; HOS=2.9110 mm; HOI=1.792 mm; HOS/HOI=1.6244; HOS/f=1.1982; InTL/HOS=0.7008; InS=2.25447 mm; and InS/HOS=0.7745, where InTL is a distance between the object-side surface 112 of the first lens 110 and the image-side surface 134 of the third lens 130; HOS is a height of the image capturing system, i.e. a distance between the object-side surface 112 of the first lens 110 and the image plane 180; InS is a distance between the aperture 100 and the image plane 180; HOI is height for image formation of the optical image capturing system, i.e., the maxmum image height; and InB is a distance between the image-side surface 134 of the third lens 130 and the image plane 180.

The optical image capturing system of the first preferred embodiment further satisfies ΣTP=1.4198 mm and ΣTP/InTL=0.6959, where ΣTP is a sum of the thicknesses of the lenses 110-130 with refractive power. It is helpful to the contrast of image and yield rate of manufacture, and provides a suitable back focal length for installation of other elements.

The optical image capturing system of the first preferred embodiment further satisfies |R1/R2|=0.3849, where R1 is a radius of curvature of the object-side surface 112 of the first lens 110, and R2 is a radius of curvature of the image-side surface 114 of the first lens 110. It provides the first lens with a suitable refractive power to reduce the increase rate of the spherical aberration.

The optical image capturing system of the first preferred embodiment further satisfies (R5−R6)/(R5+R6)=−0.0899, where R5 is a radius of curvature of the object-side surface 132 of the third lens 130, and R6 is a radius of curvature of the image-side surface 134 of the third lens 130. It may modify the astigmatic field curvature.

The optical image capturing system of the first preferred embodiment further satisfies ΣPP=f1+f3=9.3370 mm and f1/(f1+f3)=0.2434, where ΣPP is a sum of the focal lengths fp of each lens with positive refractive power. It is helpful to share the positive refractive power of the first lens 110 to the other positive lenses to avoid the significant aberration caused by the incident rays.

The optical image capturing system of the first preferred embodiment further satisfies ΣNP=f2=−5.2251 mm, where f2 is a focal length of the second lens 120, and ΣNP is a sum of the focal lengths fp of each lens with negative refractive power. It is helpful to avoiding the significant aberration caused by the incident rays.

The optical image capturing system of the first preferred embodiment further satisfies IN12=0.4068 mm and IN12/f=0.1674, where IN12 is a distance on the optical axis between the first lens 110 and the second lens 120. It may correct chromatic aberration and improve the performance.

The optical image capturing system of the first preferred embodiment further satisfies TP1=0.5132 mm; TP2=0.3363 mm; and (TP1+IN12)/TP2=2.7359, where TP1 is a central thickness of the first lens 110 on the optical axis, and TP2 is a central thickness of the second lens 120 on the optical axis. It may control the sensitivity of manufacture of the system and improve the performance.

The optical image capturing system of the first preferred embodiment further satisfies (TP3+IN23)/TP2=2.3308, where TP3 is a central thickness of the third lens 130 on the optical axis, TP2 is a central thickness of the second lens 120 on the optical axis, and IN23 is a distance on the optical axis between the second lens and the third lens. It may control the sensitivity of manufacture of the system and improve the performance.

The optical image capturing system of the first preferred embodiment further satisfies TP2/ΣTP=0.2369, where ΣTP is a sum of the central thicknesses of all the lenses with refractive power on the optical axis. It may finely modify the aberration of the incident rays and reduce the height of the system.

The optical image capturing system of the first preferred embodiment further satisfies InRS11=0.30980 mm;

InRS12=0.06425 mm; TP1=0.51321 mm; and (|InRS11|+TP1+|InRS12|)/TP1=1.7288, where InRS11 is a displacement in parallel with the optical axis from a point on the object-side surface 112 of the first lens, through which the optical axis passes, to a point at the maximum effective semi diameter of the object-side surface 112 of the first lens; InRS12 is a displacement in parallel with the optical axis from a point on the image-side surface 114 of the first lens, through which the optical axis passes, to a point at the maximum effective semi diameter of the image-side surface 114 of the first lens; and TP1 is a central thickness of the first lens 110 on the optical axis. It may control a ratio of the central thickness of the first lens 110 and the effective semi diameter thickness (thickness ratio) to increase the yield rate of manufacture.

The optical image capturing system of the first preferred embodiment further satisfies InRS21=−0.17200 mm; InRS22=−0.22685 mm; TP2=0.33628 mm; and (|InRS21|+TP2+|InRS22|)/TP2=2.1861, where InRS21 is a displacement from a point on the object-side surface 122 of the second lens passed through by the optical axis, to a point on the optical axis where a projection of the maximum effective semi diameter of the object-side surface 122 of the second lens ends; InRS22 is a displacement from a point on the image-side surface 214 of the second lens passed through by the optical axis to a point on the optical axis where a projection of the maximum effective semi diameter of the image-side surface 214 of the second lens ends.

The optical image capturing system of the first preferred embodiment further satisfies InRS31=−0.10969 mm; InRS32=−0.31953 mm; TP3=0.57029 mm; and (|InRS31|+TP3+|InRS32|)/TP3=1.7526, where InRS31 is a displacement in parallel with the optical axis from a point on the object-side surface 132 of the third lens, through which the optical axis passes, to a point at the maximum effective semi diameter of the object-side surface 132 of the third lens; InRS32 is a displacement from a point on the image-side surface 134 of the third lens passed through by the optical axis to a point on the optical axis where a projection of the maximum effective semi diameter of the image-side surface 134 of the third lens ends; and TP3 is a central thickness of the third lens 130 on the optical axis. It may control a ratio of the central thickness of the third lens 130 and the effective semi diameter thickness (thickness ratio) to increase the yield rate of manufacture.

The optical image capturing system of the first preferred embodiment further satisfies InRSO=0.59148 mm; InRSI=0.61063 mm; and Σ|InRS|=1.20211 mm, where Σ|InRS| is of an sum of absolute values of the displacements in parallel with the optical axis of each lens with refractive power from the central point to the point at the maximum effective semi diameter, i.e. Σ|InRS|=InRSO+InRSI while InRSO is of a sum of absolute values of the displacements in parallel with the optical axis of each lens with refractive power from the central point on the object-side surface to the point at the maximum effective semi diameter of the object-side surface and InRSI is of a sum of absolute values of the displacements in parallel with the optical axis of each lens with refractive power from the central point on the image-side surface to the point at the maximum effective semi diameter of the image-side surface. It is helpful to modify the off-axis view field aberration.

The optical image capturing system of the first preferred embodiment satisfies Σ|InRS|/InTL=0.58925 and Σ|InRS|/HOS=0.41295. It may reduce the total height of the system and modify the off-axis view field aberration.

The optical image capturing system of the first preferred embodiment satisfies |InRS21|+|InRS22|+|InRS31|+|InRS32|=0.82806 mm; (|InRS21|+|InRS22|+|InRS31|+|InRS32|)/InTL=0.40590; and (|InRS21|+|InRS22|+|InRS31|+|InRS32|)/HOS=0.28446. It may increase yield rate of manufacture of two of the lenses which are the first and the second closest to the image plane and modify the off-axis view field aberration.

The optical image capturing system of the first preferred embodiment satisfies HVT21=0 mm and HVT22=0 mm, where HVT21 a distance perpendicular to the optical axis between the inflection point C21 on the object-side surface 122 of the second lens and the optical axis; and HVT32 a distance perpendicular to the optical axis between the inflection point C32 on the image-side surface 124 of the second lens and the optical axis. It is helpful to modify the off-axis view field aberration.

The optical image capturing system of the first preferred embodiment satisfies HVT31=0.4455 mm; HVT32=0.6479 mm; and HVT31/HVT32=0.6876, where HVT31 a distance perpendicular to the optical axis between the inflection point C31 on the object-side surface 132 of the third lens and the optical axis; and HVT32 a distance perpendicular to the optical axis between the inflection point C32 on the image-side surface 134 of the third lens and the optical axis. It is helpful to modify the off-axis view field aberration.

The optical image capturing system of the first preferred embodiment satisfies HVT32/HOI=0.3616. It is helpful to correction of the aberration of the peripheral view field of the optical image capturing system.

The optical image capturing system of the first preferred embodiment satisfies HVT32/HOS=0.2226. It is helpful to correction of the aberration of the peripheral view field of the optical image capturing system.

The second lens 120 has negative refractive power. The optical image capturing system of the first preferred embodiment further satisfies |NA2/NA1|=0.4006; |NA1−NA2|=33.5951; and NA3/NA2=2.4969, where NA1 is an Abbe number of the first lens 110; NA2 is an Abbe number of the second lens 120; and NA3 is an Abbe number of the third lens 130. It may correct the aberration of the optical image capturing system.

The optical image capturing system of the first preferred embodiment further satisfies 0<(|InRS12|+|InRS21|)/IN12=0.5807 and 0<(|InRS22|+|InRS31|)/IN23=1.5762, where IN12 is a distance on the optical axis between the first lens and the second lens, and IN23 is a distance on the optical axis between the second lens and the third lens. It may increase the capacity of adjusting the optical path difference, and keep the system miniaturized.

The optical image capturing system of the first preferred embodiment further satisfies |TDT|=1.2939% and |ODT|=1.4381%, where TDT is TV distortion; and ODT is optical distortion.

The parameters of the lenses of the first embodiment are listed in Table 1 and Table 2.

TABLE 1 f = 2.42952 mm; f/HEP = 2.02; HAF = 35.87 deg; tan(HAF) = 0.7231

| Surface | | Radius of curvature (mm) | Thickness (mm) | Material | Refractive index | Abbe number | Focal length (mm) |
|---|---|---|---|---|---|---|---|
| 0 | Object | plane | 600 | | | | |
| 1 | 1$^{st}$ lens | 0.849 | 0.513 | plastic | 1.535 | 56.070 | 2.273 |
| 2 | | 2.205 | 0.143 | | | | |
| 3 | Aperture | plane | 0.263 | | | | |
| 4 | 2$^{nd}$ lens | −1.208 | 0.336 | plastic | 1.643 | 22.470 | −5.225 |
| 5 | | −2.085 | 0.214 | | | | |
| 6 | 3$^{rd}$ lens | 1.178 | 0.570 | plastic | 1.544 | 56.090 | 7.012 |
| 7 | | 1.411 | 0.114 | | | | |
| 8 | Filter | plane | 0.210 | BK7_SCHOTT | | | |
| 9 | | plane | 0.550 | | | | |
| 10 | Image plane | plane | 0.000 | | | | |

Reference wavelength: 555 nm; Position of blocking light: blocking at the first surface with effective semi diameter of 0.640 mm.

TABLE 2

Coefficients of the aspheric surfaces

| Surface | 1 | 2 | 4 | 5 | 6 | 7 |
|---|---|---|---|---|---|---|
| k = | 1.22106E−01 | 1.45448E+01 | 8.53809E−01 | 4.48992E−01 | −1.44104E+01 | −3.61090E+00 |
| A4 = | −6.43320E−04 | −9.87186E−02 | −7.81909E−01 | −1.69310E+00 | −7.90920E−01 | −5.19895E−01 |
| A6 = | −2.58026E−02 | 2.63247E+00 | −8.49939E−01 | 5.85139E+00 | 4.98290E−01 | 4.24519E−01 |
| A8 = | 1.00186E+00 | −5.88099E+01 | 3.03407E+01 | −1.67037E+01 | 2.93540E−01 | −3.12444E−01 |
| A10 = | −4.23805E+00 | 5.75648E+02 | −3.11976E+02 | 2.77661E+01 | −3.15288E−01 | 1.42703E−01 |
| A12 = | 9.91922E+00 | −3.00096E+03 | 1.45641E+03 | −5.46620E+00 | −9.66930E−02 | −2.76209E−02 |
| A14 = | −1.17917E+01 | 7.91934E+03 | −2.89774E+03 | −2.59816E+01 | 1.67006E−01 | −3.11872E−03 |
| A16 = | 8.87410E+00 | −8.51578E+03 | 1.35594E+03 | 1.43091E+01 | −4.43712E−02 | 1.34499E−03 |
| A18 = | 0.00000E+00 | 0.00000E+00 | 0.00000E+00 | 0.00000E+00 | 0.00000E+00 | 0.00000E+00 |
| A20 = | 0.00000E+00 | 0.00000E+00 | 0.00000E+00 | 0.00000E+00 | 0.00000E+00 | 0.00000E+00 |

The detail parameters of the first preferred embodiment are listed in Table 1, in which the unit of radius of curvature, thickness, and focal length are millimeter, and surface 0-10 indicates the surfaces of all elements in the system in sequence from the object side to the image side. Table 2 is the list of coefficients of the aspheric surfaces, in which A1-A20 indicate the coefficients of aspheric surfaces from the first order to the twentieth order of each aspheric surface. The following embodiments have the similar diagrams and tables, which are the same as those of the first embodiment, so we do not describe it again.

Second Embodiment

Figure 2A:
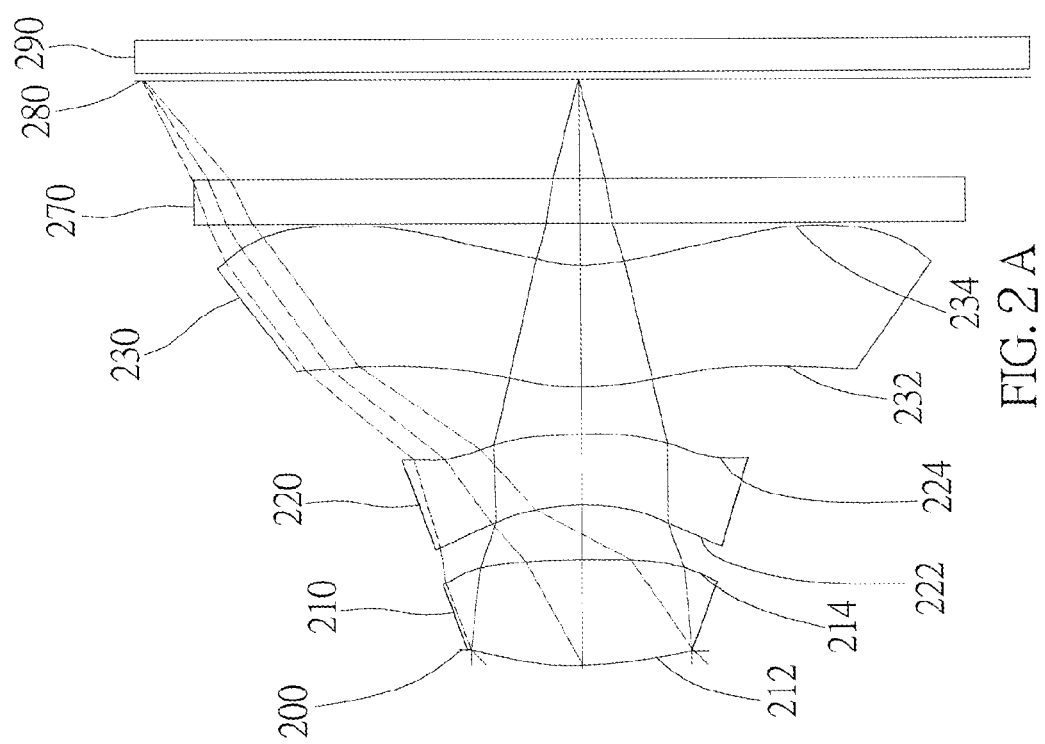
FIG. 2A is a schematic diagram of a second preferred embodiment of the present invention.
Figure 2:
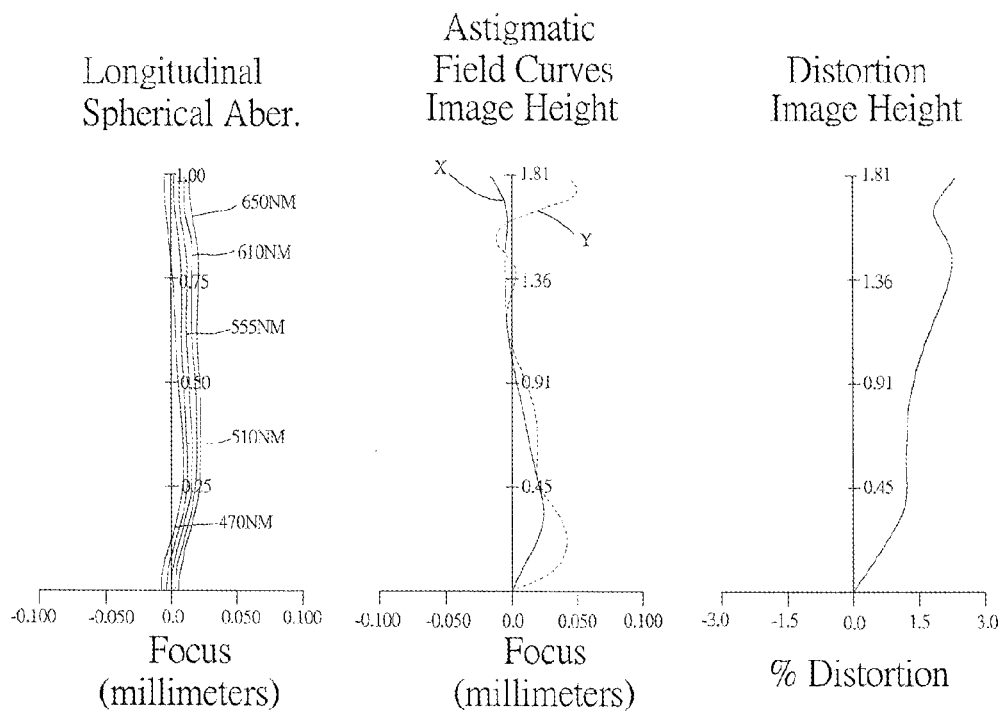
FIG. 2B shows curve diagrams of longitudinal spherical aberration, astigmatic field, and optical distortion of the optical image capturing system in the order from left to right of the second embodiment of the present application.
FIG. 2C shows a curve diagram of TV distortion of the optical image capturing system of the second embodiment of the present application.
Figure 2:
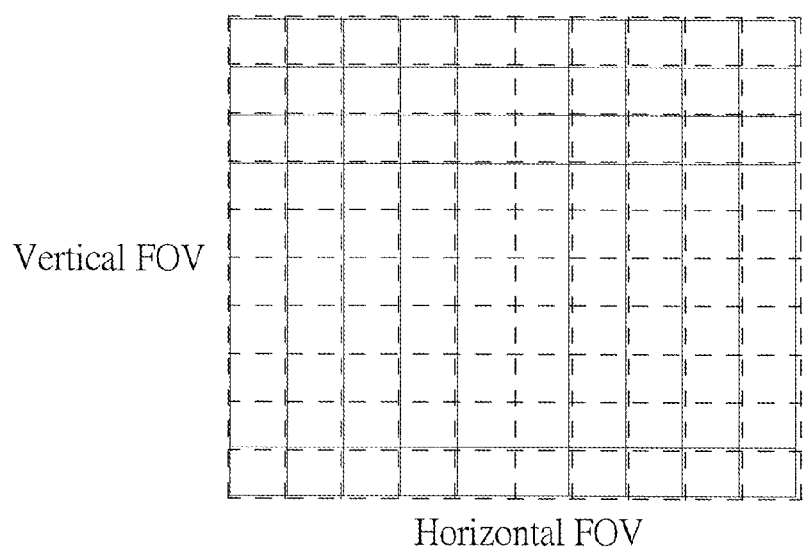

As shown in FIG. 2A and FIG. 2B, an optical image capturing system of the second preferred embodiment of the present invention includes, along an optical axis from an object side to an image side, an aperture 200, a first lens 210, a second lens 220, a third lens 230, an infrared rays filter 270, an image plane 280, and an image sensor 290.

The first lens 210 has positive refractive power, and is made of plastic. Both an object-side surface 212 thereof, which faces the object side, and an image-side surface 214 thereof, which faces the image side, are convex aspheric surfaces. The object-side surface 212 has an inflection point.

The second lens 220 has negative refractive power, and is made of plastic. An object-side surface 222 thereof, which faces the object side, is a concave aspheric surface, and an image-side surface 224 thereof, which faces the image side, is a convex aspheric surface. The object-side surface 222 has two inflection points, and the image-side surface 224 has an inflection point.

The third lens 230 has positive refractive power, and is made of plastic. An object-side surface 232, which faces the object side, is a convex aspheric surface, and an image-side surface 234, which faces the image side, is a concave aspheric surface. The object-side surface 232 and the image-side surface 234 each has an inflection point.

The infrared rays filter 270 is made of glass, and between the third lens 230 and the image plane 280. The infrared rays filter 270 gives no contribution to the focal length of the system.

The optical image capturing system of the second preferred embodiment has the following parameters, which are |f2|=3.346 mm; |f1|=1.835 mm; and |f2|>|f1|, where f1 is a focal length of the first lens 210 and f2 is a focal length of the second lens 220.

The optical image capturing system of the second preferred embodiment further satisfies TP2=0.348 mm and TP3=0.596 mm, where TP2 is a thickness of the second lens 220 on the optical axis, and TP3 is a thickness of the third lens 230 on the optical axis.

In the second embodiment, the first and the third lenses 210 and 230 are positive lenses, and their focal lengths are f1 and f3. The optical image capturing system of the second preferred embodiment further satisfies ΣPP=f1+f3=6.4494 mm and f1/(f1+f3)=0.2845, where ΣPP is a sum of the focal lengths of each positive lens. It is helpful to share the positive refractive power of the first lens 210 to the other positive lenses to avoid the significant aberration caused by the incident rays.

The optical image capturing system of the second preferred embodiment further satisfies ΣNP=f2, where f2 is a focal length of the second lens 220, and ΣNP is a sum of the focal lengths of each negative lens.

The parameters of the lenses of the second embodiment are listed in Table 3 and Table 4.

TABLE 3 f = 2.057 mm; f/HEP = 2.2; HAF = 40.555 deg; tan(HAF) = 0.8557

| Surface | | Radius of curvature (mm) | Thickness (mm) | Material | Refractive index | Abbe number | Focal length (mm) |
|---|---|---|---|---|---|---|---|
| 0 | Object | plane | 800 | | | | |
| 1 | 1st lens/Aperture | 1.256364 | 0.512 | plastic | 1.535 | 56.070 | 1.835 |
| 2 | | −3.896796 | 0.257 | | | | |
| 3 | 2nd lens | −0.849689 | 0.348 | plastic | 1.642 | 22.455 | −3.346 |
| 4 | | −1.622565 | 0.225 | | | | |
| 5 | 3rd lens | 0.855066 | 0.596 | plastic | 1.535 | 56.070 | 4.614 |
| 6 | | 0.988683 | 0.184 | | | | |
| 7 | Filter | plane | 0.210 | BK7_SCHOTT | 1.515 | 64.135 | |
| 8 | | plane | 0.485 | | | | |
| 9 | Image plane | plane | | | | | |

Reference wavelength: 555 nm

TABLE 4

Coefficients of the aspheric surfaces

| | Surface | | | | | |
|---|---|---|---|---|---|---|
| | 1 | 2 | 3 | 4 | 5 | 6 |
| k | −8.543668E−01 | −5.000000E+01 | 8.361153E−01 | −9.606588E+01 | −9.566282E+00 | −7.570904E−01 |
| A4 | −1.852370E−01 | −6.743225E−01 | −6.017233E−01 | −3.943839E+00 | −4.207809E−01 | −7.299115E−01 |
| A6 | 6.648515E+00 | −1.248606E+00 | 4.925600E+00 | 3.223536E+01 | 3.728905E−01 | 6.310904E−01 |
| A8 | −2.085146E+02 | −3.374586E+00 | 8.963763E+00 | −2.143038E+02 | 8.867358E−03 | −1.196737E−01 |
| A10 | 3.454832E+03 | −5.793885E+02 | −1.793678E+02 | 1.083792E+03 | 1.812797E−01 | −7.013291E−01 |
| A12 | −3.462627E+04 | 4.669191E+03 | 2.527606E+03 | −3.769143E+03 | −1.551975E+00 | 1.125515E+00 |
| A14 | 2.134099E+05 | −2.262385E+04 | −1.516711E+04 | 8.777716E+03 | 2.576755E+00 | −8.686918E−01 |
| A16 | −7.912456E+05 | 6.583015E+04 | 4.850963E+04 | −1.303191E+04 | −1.935997E+00 | 3.745895E−01 |
| A18 | 1.618173E+06 | −1.060853E+05 | −8.162442E+04 | 1.109631E+04 | 7.046488E−01 | −8.589537E−02 |
| A20 | −1.402923E+06 | 7.247224E+04 | 5.742924E+04 | −4.116041E+03 | −1.009718E−01 | 8.140552E−03 |

An equation of the aspheric surfaces of the second embodiment is the same as that of the first embodiment, and the definitions are the same as well.

The exact parameters of the second embodiment based on Table 3 and Table 4 are listed in the following table:

Second embodiment (Reference wavelength: 555 nm)

| InRS11 | InRS12 | InRS21 | InRS22 | InRS31 | InRS32 |
|---|---|---|---|---|---|
| 0.07590 | −0.11042 | −0.19932 | −0.11226 | 0.07361 | −0.00931 |

| InRSO | InRSI | Σ|InRS| | Σ|InRS|/InTL | Σ|InRS|/HOS |
|---|---|---|---|---|
| 0.34883 | 0.23200 | 0.58083 | 0.29980 | 0.20625 |

| |InRS31|/TP3 | |InRS32|/TP3 | (|InRS12| + |InRS21|)/IN12 | (|InRS22| + |InRS31|)/IN23 |
|---|---|---|---|
| 0.1236 | 0.0156 | 1.2043 | 0.8253 |

| (|InRS21| + |InRS22| + |InRS31| + |InRS32|)/InTL | (|InRS21| + |InRS22| + |InRS31| + |InRS32|)/HOS | f1/Σ PP | f4/Σ NP | IN12/f |
|---|---|---|---|---|
| 0.20363 | 0.14009 | 0.14087 | 0.10678 | 0.18143 |

Second embodiment (Reference wavelength: 555 nm)

| |f/f1| | |f/f2| | |f/f3| | |f1/f3| | |f1/f2| | |f2/f3| |
|---|---|---|---|---|---|
| 1.12093 | 0.61474 | 0.44575 | 2.51472 | 1.82341 | 1.37913 |

| Σ PPR | Σ NPR | Σ PPR/Σ NPR| | Σ PP | Σ NP | f1/Σ PP |
|---|---|---|---|---|---|
| 1.56667 | 0.61474 | 2.54850 | 6.44941 | −3.34590 | 0.28452 |

| IN12/f | |ODT|% | |TDT|% | (TP1 + IN12)/TP2 | (TP3 + IN23)/TP2 | TP2/Σ TP |
|---|---|---|---|---|---|
| 0.12504 | 2.49952 | 0.66431 | 2.36163 | 2.36163 | 0.23891 |

| HOS | InTL | HOS/HOI | InS/HOS | InTL/HOS | Σ TP/InTL |
|---|---|---|---|---|---|
| 2.81613 | 1.93738 | 1.55159 | 0.97305 | 0.68796 | 0.75100 |

| HVT21 | HVT22 | HVT31 | HVT32 | HVT32/HOI | HVT32/HOS |
|---|---|---|---|---|---|
| 0.00000 | 0.61861 | 0.80107 | 1.01856 | 0.56119 | 0.36169 |

The results of the equations of the third embodiment based on Table 3 and Table 4 are listed in the following table:

Values related to the inflection points of the second embodiment
(Reference wavelength: 555 nm)

| | | | | | | | |
|---|---|---|---|---|---|---|---|
| HIF111 | 0.4160 | HIF111/HOI | 0.2292 | SGI111 | 0.0642 | \|SGI111\|/(\|SGI111\| + TP1) | 0.1115 |
| HIF211 | 0.4429 | HIF211/HOI | 0.2440 | SGI211 | −0.1277 | \|SGI211\|/(\|SGI211\| + TP2) | 0.2686 |
| HIF212 | 0.5690 | HIF212/HOI | 0.3135 | SGI212 | −0.1911 | \|SGI212\|/(\|SGI212\| + TP2) | 0.3548 |
| HIF221 | 0.4383 | HIF221/HOI | 0.2415 | SGI221 | −0.0815 | \|SGI221\|/(\|SGI221\| + TP2) | 0.1900 |
| HIF311 | 0.3089 | HIF311/HOI | 0.1702 | SGI311 | 0.0419 | \|SGI311\|/(\|SGI311\| + TP3) | 0.0658 |
| HIF321 | 0.4394 | HIF321/HOI | 0.2421 | SGI321 | 0.0759 | \|SGI321\|/(\|SGI321\| + TP3) | 0.1130 |

Third Embodiment

Figure 3A:
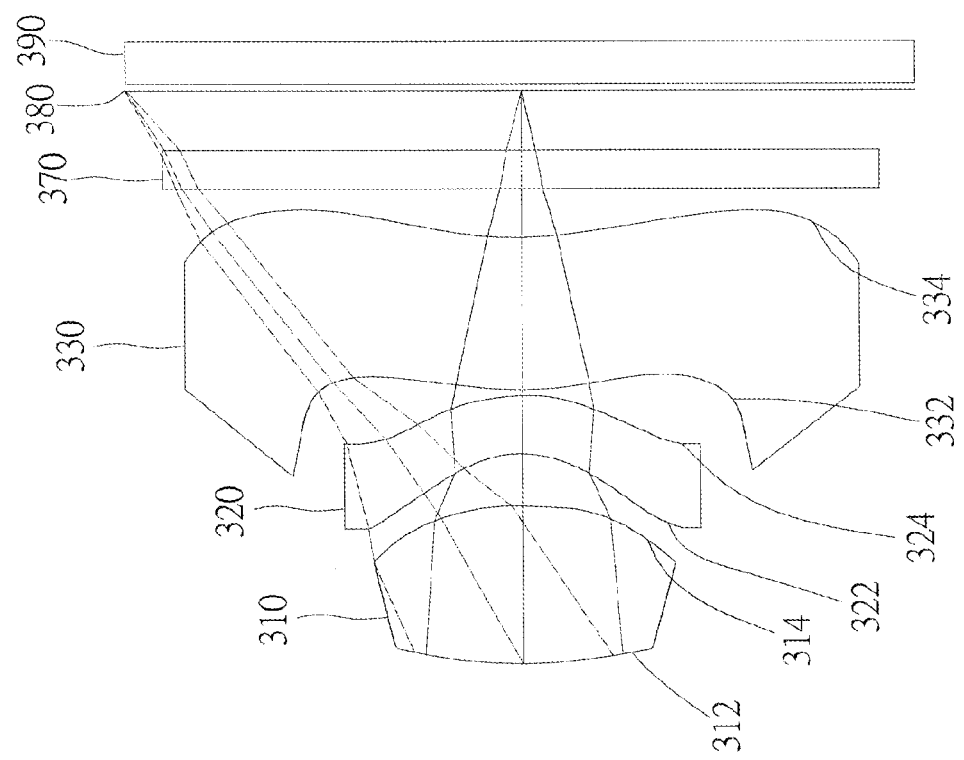
FIG. 3A is a schematic diagram of a third preferred embodiment of the present invention.
Figure 3:
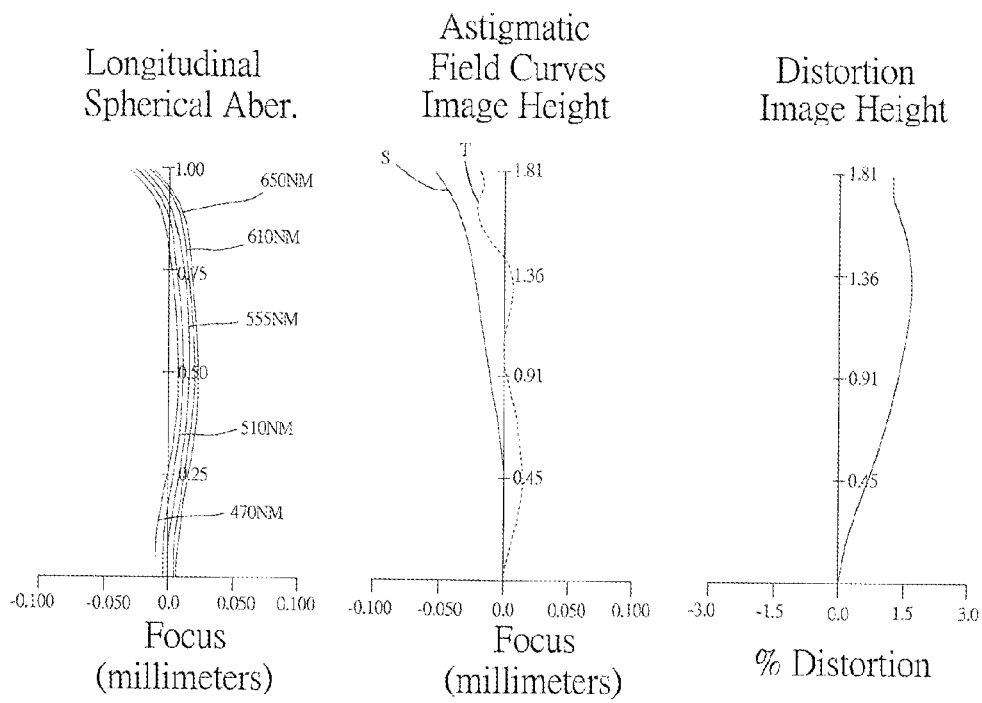
FIG. 3B shows curve diagrams of longitudinal spherical aberration, astigmatic field, and optical distortion of the optical image capturing system in the order from left to right of the third embodiment of the present application.
FIG. 3C shows a curve diagram of TV distortion of the optical image capturing system of the third embodiment of the present application.
Figure 3:
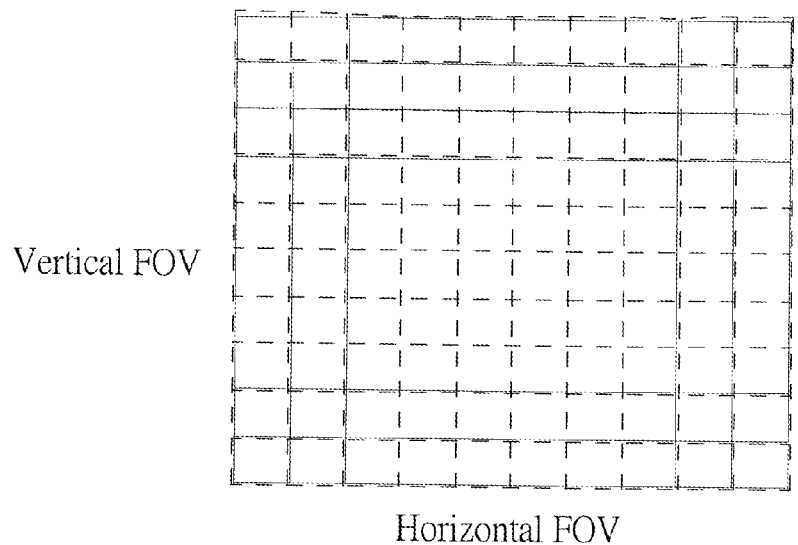

As shown in FIG. 3A and FIG. 3B, an optical image capturing system of the third preferred embodiment of the present invention includes, along an optical axis from an object side to an image side, an aperture 300, a first lens 310, a second lens 320, a third lens 330, an infrared rays filter 370, an image plane 380, and an image sensor 390.

The first lens 310 has positive refractive power, and is made of plastic. Both an object-side surface 312 thereof, which faces the object side, and an image-side surface 314 thereof, which faces the image side, are convex aspheric surfaces. The object-side surface 312 has two inflection points, and the image-side surface 314 has an inflection point.

The second lens 320 has negative refractive power, and is made of plastic. An object-side surface 322 thereof, which faces the object side, is a concave aspheric surface, and an image-side surface 324 thereof, which faces the image side, is a convex aspheric surface. The object-side surface 322 and the image-side surface 324 each has an inflection point.

The third lens 330 has positive refractive power, and is made of plastic. An object-side surface 332, which faces the object side, is a convex aspheric surface, and an image-side surface 334, which faces the image side, is a convex aspheric surface, and both the object-side surface 332 and the image-side surface 334 each has a inflection point.

The infrared rays filter 370 is made of glass, and between the third lens 330 and the image plane 380. The infrared rays filter 370 gives no contribution to the focal length of the system.

The parameters of the lenses of the third preferred embodiment are $|f2|=3.037$ mm; $|f1|=1.412$; and $|f2|>|f1|$, where f1 is a focal length of the first lens 310 and f2 is a focal length of the second lens 320.

The optical image capturing system of the third preferred embodiment further satisfies TP2=0.311 mm and TP3=0.815 mm, where TP2 is a thickness of the second lens 320 on the optical axis, and TP3 is a thickness of the third lens 330 on the optical axis.

The optical image capturing system of the third preferred embodiment further satisfies $\Sigma PP=f1+f3=10.86930$ mm and $f1/(f1+f3)=0.12995$, where $\Sigma PP$ is a sum of the focal lengths of each positive lens. It is helpful to share the positive refractive power of the first lens 310 to the other positive lenses to avoid the significant aberration caused by the incident rays.

The optical image capturing system of the third preferred embodiment further satisfies $\Sigma NP=f2$, where f2 is a focal length of the second lens 320 and $\Sigma NP$ is a sum of the focal lengths of each negative lens.

The parameters of the lenses of the third embodiment are listed in Table 5 and Table 6.

TABLE 5 f = 1.980 mm; f/HEP = 2.2; HAF = 41.898 deg; tan(HAF) = 0.8972

| Surface | | Radius of curvature (mm) | Thickness (mm) | Material | Refractive index | Abbe number | Focal length (mm) |
|---|---|---|---|---|---|---|---|
| 0 | Object | plane | 600 | | | | |
| 1 | Aperture | plane | −0.010 | plastic | 1.534598 | 56.070 | 1.412 |
| 2 | 1$^{st}$ lens | 1.691109 | 0.846 | | | | |
| 3 | | −1.132732 | 0.278 | | 1.642495 | 22.455 | −3.037 |
| 4 | 2$^{nd}$ lens | −0.391595 | 0.311 | plastic | | | |
| 5 | | −0.641741 | 0.030 | | 1.534598 | 56.070 | 9.457 |
| 6 | 3$^{rd}$ lens | 1.406985 | 0.815 | plastic | | | |
| 7 | | 1.553255 | 0.252 | | 1.5146 | 64.135 | |
| 8 | Filter | plane | 0.210 | BK7_SCHOTT | | | |
| 9 | | plane | 0.318 | | | | |
| 10 | Image plane | plane | | | | | |

Reference wavelength: 555 nm.

TABLE 6

Coefficients of the aspheric surfaces

| | Surface | | | | | |
|---|---|---|---|---|---|---|
| | 1 | 2 | 4 | 5 | 6 | 7 |
| k | −1.949115E+01 | −2.320148E+00 | −7.413095E−01 | −9.167540E−01 | −2.841731E−01 | −5.961438E+00 |
| A4 | 2.503769E−01 | −5.273542E−01 | 1.655925E+00 | 4.218113E−01 | −6.113581E−01 | −1.131550E−01 |
| A6 | −1.682460E−01 | 9.285361E−01 | −1.468505E+00 | −3.857547E−01 | 3.316423E−01 | 4.313548E−02 |
| A8 | −5.745426E+00 | −7.689350E+00 | 7.090514E+00 | 2.868973E+00 | 1.295575E−01 | −2.339485E−02 |
| A10 | 1.711465E+01 | 2.199660E+01 | 5.324183E+00 | −2.289240E+00 | −3.944963E−01 | −1.799633E−03 |
| A12 | 2.558724E+01 | 1.216111E+01 | −5.050230E+01 | −1.590342E+00 | −1.036998E+00 | 8.737996E−03 |
| A14 | −3.979505E+02 | −1.451439E+02 | 5.272043E+01 | −9.558163E−01 | 2.553700E+00 | −4.233080E−03 |
| A16 | 9.232178E+02 | 1.634916E+02 | 1.465224E+01 | 3.506766E+00 | −1.540374E+00 | 5.775537E−04 |

An equation of the aspheric surfaces of the third embodiment is the same as that of the first embodiment, and the definitions are the same as well.

The exact parameters of the third embodiment based on Table 5 and Table 6 are listed in the following table:

Third embodiment (Reference wavelength: 555 nm)

| InRS11 | InRS12 | InRS21 | InRS22 | InRS31 | InRS32 |
|---|---|---|---|---|---|
| −0.01294 | −0.02207 | 0.66345 | 1.02598 | 1.80039 | 0.41605 |

| InRSO | InRSI | Σ|InRS| | Σ|InRS|/InTL | Σ|InRS|/HOS |
|---|---|---|---|---|
| 0.46423 | 0.57341 | 1.03764 | 0.45504 | 0.33901 |

| |InRS31|/TP3 | |InRS32|/TP3 | (|InRS12| + |InRS21|)/IN12 | (|InRS22| + |InRS31|)/IN23 |
|---|---|---|---|
| 0.01588 | 0.02707 | 2.4550 | 9.1626 |

| (|InRS21| + |InRS22| + |InRS31| + |InRS32|)/InTL | (|InRS21| + |InRS22| + |InRS31| + |InRS32|)/HOS |
|---|---|
| 0.30240 | 0.22529 |

Third embodiment (Reference wavelength: 555 nm)

| |f/f1| | |f/f2| | |f/f3| | |f1/f3| | |f1/f2| | |f2/f3| |
|---|---|---|---|---|---|
| 1.40190 | 0.65197 | 0.20938 | 6.69535 | 2.15026 | 3.11374 |

| Σ PPR | Σ NPR | Σ PPR/|Σ NPR| | Σ PP | Σ NP | f1/Σ PP |
|---|---|---|---|---|---|
| 1.61128 | 0.65197 | 2.47142 | 10.86930 | −3.03714 | 0.12995 |

| IN12/f | |ODT|% | |TDT|% | (TP1 + IN12)/TP2 | (TP3 + IN23)/TP2 | TP2/Σ TP |
|---|---|---|---|---|---|
| 0.14047 | 1.80039 | 0.41605 | 2.71454 | 2.71454 | 0.15787 |

| HOS | InTL | HOS/HOI | InS/HOS | InTL/HOS | Σ TP/InTL |
|---|---|---|---|---|---|
| 3.06079 | 2.28034 | 1.68639 | 0.99670 | 0.74502 | 0.86489 |

| HVT21 | HVT22 | HVT31 | HVT32 | HVT32/HOI | HVT32/HOS |
|---|---|---|---|---|---|
| 0.00000 | 0.78004 | 0.66345 | 1.02598 | 0.56528 | 0.33520 |

The results of the equations of the third embodiment based on Table 5 and Table 6 are listed in the following table:

Values related to the inflection points of the third embodiment
(Reference wavelength: 555 nm)

| HIF111 | 0.3968 | HIF111/HOI | 0.2186 | SGI111 | 0.0419 | |SGI111|/(|SGI111| + TP1) | 0.0472 |
|---|---|---|---|---|---|---|---|
| HIF112 | 0.4812 | HIF112/HOI | 0.2651 | SGI112 | 0.0566 | |SGI112|/(|SGI112| + TP1) | 0.0628 |
| HIF121 | 0.6652 | HIF121/HOI | 0.3665 | SGI121 | −0.2720 | |SGI121|/(|SGI121| + TP1) | 0.2434 |
| HIF211 | 0.4516 | HIF211/HOI | 0.2488 | SGI211 | −0.2200 | |SGI211|/(|SGI211| + TP2) | 0.4140 |
| HIF221 | 0.4685 | HIF221/HOI | 0.2581 | SGI221 | −0.1514 | |SGI221|/(|SGI221| + TP2) | 0.3271 |
| HIF311 | 0.3546 | HIF311/HOI | 0.1954 | SGI311 | 0.0362 | |SGI311|/(|SGI311| + TP3) | 0.0425 |
| HIF321 | 0.5404 | HIF321/HOI | 0.2977 | SGI321 | 0.0743 | |SGI321|/(|SGI321| + TP3) | 0.0835 |

Fourth Embodiment

Figure 4A:
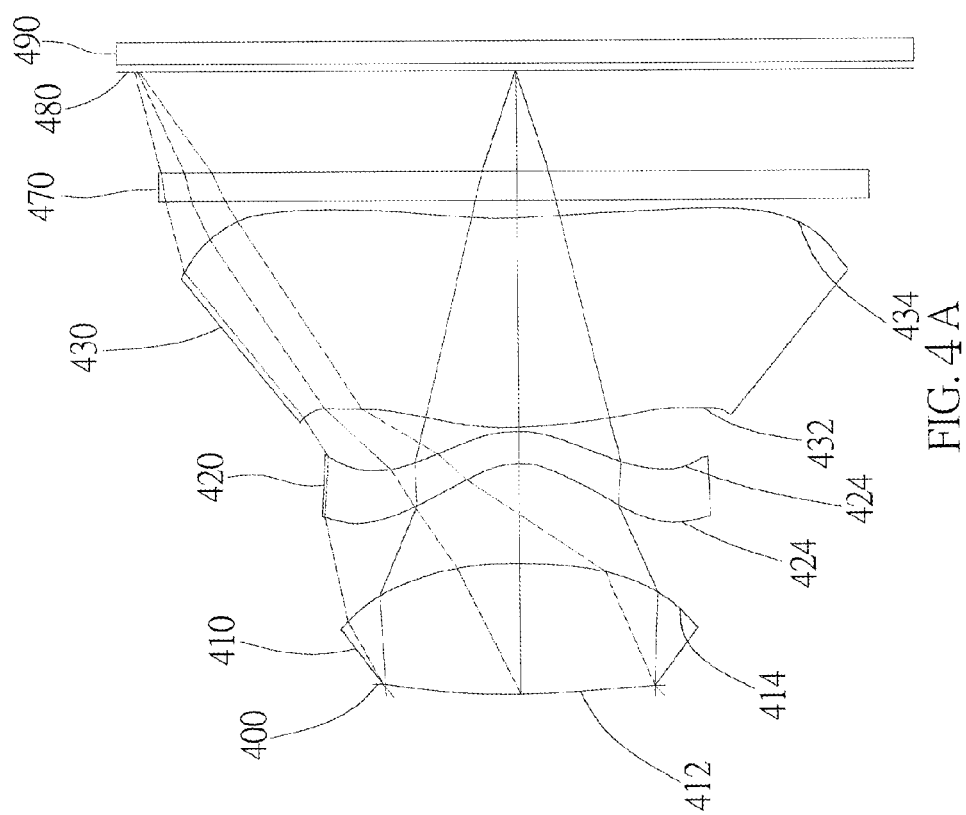
FIG. 4A is a schematic diagram of a fourth preferred embodiment of the present invention.
Figure 4:
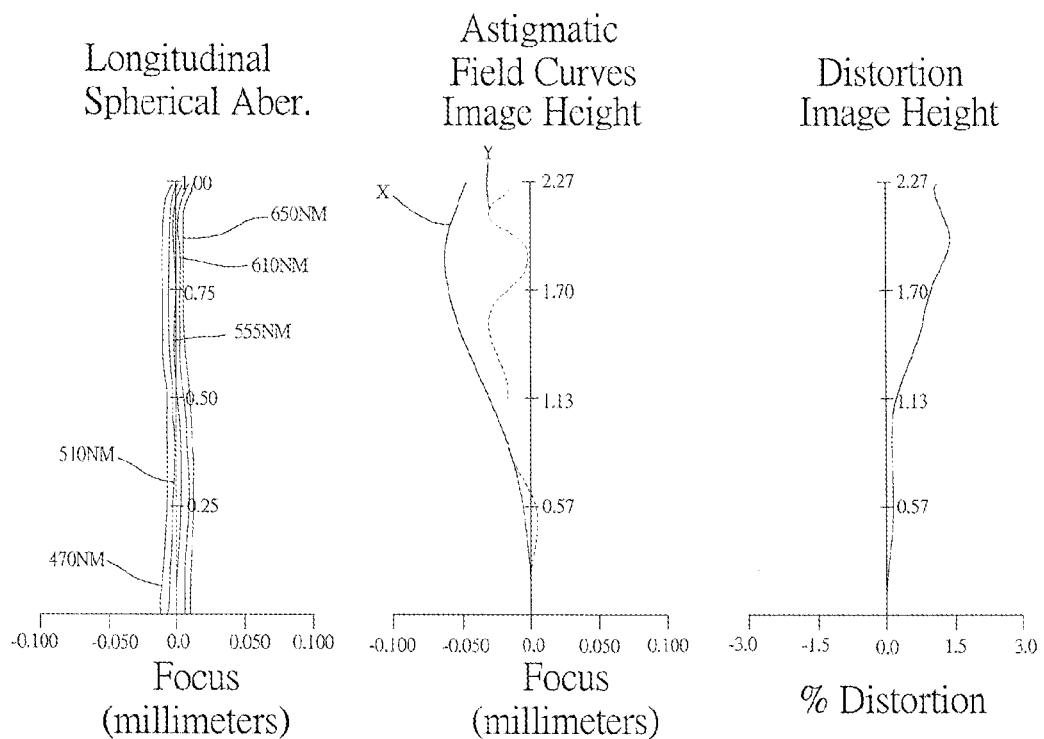
FIG. 4B shows curve diagrams of longitudinal spherical aberration, astigmatic field, and optical distortion of the optical image capturing system in the order from left to right of the fourth embodiment of the present application.
FIG. 4C shows a curve diagram of TV distortion of the optical image capturing system of the fourth embodiment of the present application.
Figure 4:
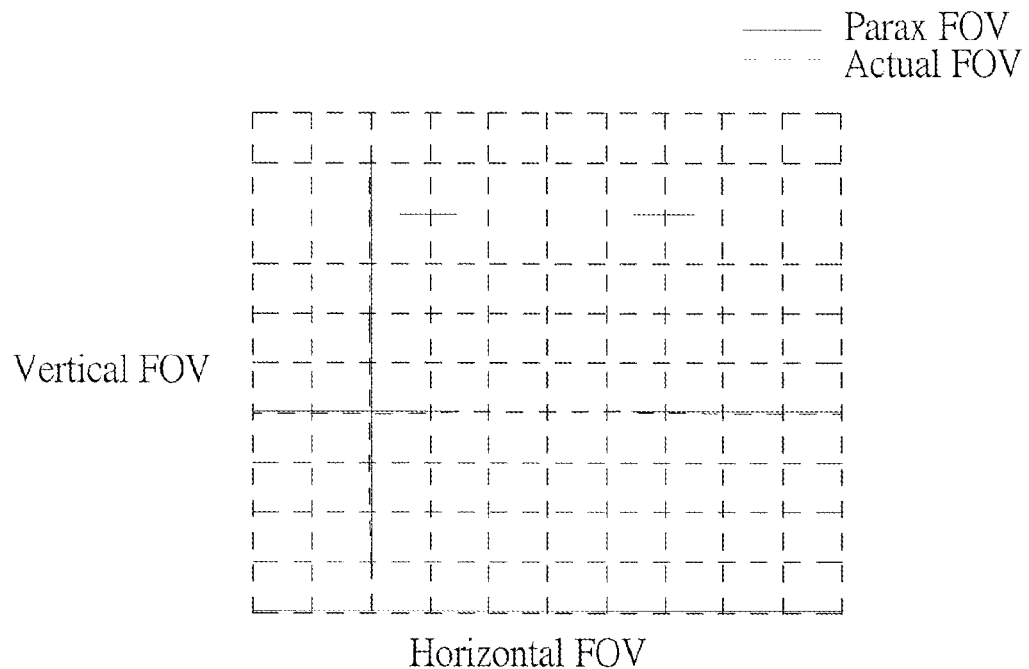

As shown in FIG. 4A and FIG. 4B, an optical image capturing system of the fourth preferred embodiment of the present invention includes, along an optical axis from an object side to an image side, an aperture 400, a first lens 410, a second lens 420, a third lens 430, an infrared rays filter 470, an image plane 480, and an image sensor 490.

The first lens 410 has positive refractive power, and is made of plastic. Both an object-side surface 412 thereof, which faces the object side, and an image-side surface 414 thereof, which faces the image side, are convex aspheric surfaces. The object-side surface 412 has an inflection point.

The second lens 420 has negative refractive power, and is made of plastic. An object-side surface 422 thereof, which faces the object side, is a concave aspheric surface, and an image-side surface 424 thereof, which faces the image side, is a convex aspheric surface. The object-side surface 422 and image-side surface 424 each has an inflection point.

The third lens 430 has positive refractive power, and is made of plastic. An object-side surface 432, which faces the object side, is a convex aspheric surface, and an image-side surface 434, which faces the image side, is a concave aspheric surface. The object-side surface 432 and the image-side surface 434 each has an inflection point.

The infrared rays filter 470 is made of glass, and between the third lens 430 and the image plane 480. The infrared rays filter 470 gives no contribution to the focal length of the system.

The optical image capturing system of the fourth preferred embodiment has the following parameters, which are $|f2|=2.629$ mm; $|f1|=2.450$ mm; and $|f2|>|f1|$, where f1 is a focal length of the first lens 410 and f2 is a focal length of the second lens 420.

The optical image capturing system of the fourth preferred embodiment further satisfies TP2=0.215 mm and TP3=1.444 mm, where TP2 is a thickness of the second lens 420 on the optical axis, and TP3 is a thickness of the third lens 430 on the optical axis.

In the fourth embodiment, the first and the third lenses 410 and 430 are positive lenses, and their focal lengths are f1 and f3. The optical image capturing system of the fourth preferred embodiment further satisfies $\Sigma PP=f1+f3=5.70439$ mm and $f1/(f1+f3)=0.42948$, where $\Sigma PP$ is a sum of the focal lengths of each positive lens. It is helpful to share the positive refractive power of the first lens 410 to the other positive lenses to avoid the significant aberration caused by the incident rays.

The optical image capturing system of the fourth preferred embodiment further satisfies $\Sigma NP=f2$, where f2 is a focal length of the second lens 420, and $\Sigma NP$ is a sum of the focal lengths of each negative lens.

The parameters of the lenses of the fourth embodiment are listed in Table 7 and Table 8.

TABLE 7 f = 2.890 mm; f/HEP = 1.8; HAF = 37.761 deg; tan(HAF) = 0.7746

| Surface | | Radius of curvature (mm) | Thickness (mm) | Material | Refractive index | Abbe number | Focal length (mm) |
|---|---|---|---|---|---|---|---|
| 0 | Object | plane | 3000 | | | | |
| 1 | 1st lens | plane | 0.025 | | | | |
| 2 | | 2.998988 | 0.893 | plastic | 1.544 | 56.09 | 2.450 |
| 3 | Aperture | −2.159869 | 0.682 | | | | |
| 4 | 2nd lens | −0.401292 | 0.215 | plastic | 1.642 | 22.46 | −2.629 |
| 5 | | −0.635803 | 0.025 | | | | |
| 6 | 3rd lens | 1.397267 | 1.444 | plastic | 1.544 | 56.09 | 3.254 |
| 7 | | 4.156130 | 0.115 | | | | |
| 8 | Filter | plane | 0.200 | BK7_SCHOTT | 1.517 | 64.13 | |
| 9 | | plane | 0.700 | | | | |
| 10 | Image plane | plane | | | | | |

Reference wavelength: 555 nm;
Position of blocking light: blocking at the third surface with effective semi diameter of 1.060 mm.

TABLE 8

Coefficients of the aspheric surfaces

| | Surface | | | | | |
|---|---|---|---|---|---|---|
| | 2 | 3 | 4 | 5 | 6 | 7 |
| k | 1.362696E+00 | −1.607824E+01 | −1.779113E+00 | −3.128736E+00 | −1.005235E−01 | −2.890826E+00 |
| A4 | −1.061802E−01 | −3.186043E−01 | 7.275449E−01 | −2.388256E−01 | −6.439017E−01 | −7.999813E−02 |
| A6 | 1.443026E−01 | 3.892705E−01 | −2.157641E+00 | 2.301212E+00 | 1.331801E+00 | 9.268036E−03 |
| A8 | −1.855754E+00 | −1.650198E+00 | 6.151816E+00 | −8.689047E+00 | −2.924987E+00 | 5.818126E−02 |
| A10 | 1.030755E+01 | 6.535161E+00 | −9.764070E+00 | 2.353544E+01 | 4.925219E+00 | −7.513945E−02 |
| A12 | −3.800603E+01 | −1.658255E+01 | 8.106311E+00 | −4.084789E+01 | −5.939244E+00 | 4.408450E−02 |
| A14 | 8.939147E+01 | 2.569899E+01 | −2.403390E+00 | 4.443919E+01 | 4.868202E+00 | −1.422997E−02 |
| A16 | −1.287995E+02 | −2.370893E+01 | −1.223613E+00 | −2.949477E+01 | −2.564171E+00 | 2.510706E−03 |
| A18 | 1.029344E+02 | 1.195833E+01 | 1.147289E+00 | 1.095734E+01 | 7.802818E−01 | −2.131331E−04 |
| A20 | −3.486733E+01 | −2.541992E+00 | −2.557074E−01 | −1.749401E+00 | −1.043312E−01 | 5.517283E−06 |

An equation of the aspheric surfaces of the fourth embodiment is the same as that of the first embodiment, and the definitions are the same as well.

The exact parameters of the fourth embodiment based on Table 7 and Table 8 are listed in the following table:

| Fourth embodiment (Reference wavelength: 555 nm) | | | | | |
|---|---|---|---|---|---|
| InRS11 | InRS12 | InRS21 | InRS22 | InRS31 | InRS32 |
| 0.04755 | −0.40369 | −0.35611 | −0.16085 | 0.08248 | −0.37336 |
| InRSO | InRSI | Σ\|InRS\| | Σ\|InRS\|/InTL | Σ\|InRS\|/HOS | |
| 0.48614 | 0.93790 | 1.42404 | 0.43682 | 0.33311 | |
| \|InRS31\|/TP3 | \|InRS32\|/TP3 | (\|InRS12\| + \|InRS21\|)/IN12 | (\|InRS22\| + \|InRS31\|)/IN23 | | |
| 0.05711 | 0.25850 | 1.1136 | 9.7333 | | |
| (\|InRS21\| + \|InRS22\| + \|InRS31\| + \|InRS32\|)/InTL | | (\|InRS21\| + \|InRS22\| + \|InRS31\| + \|InRS32\|)/HOS | | | |
| 0.29840 | | 0.22756 | | | |
| \|f/f1\| | \|f/f2\| | \|f/f3\| | \|f1/f3\| | \|f1/f2\| | \|f2/f3\| |
| 1.17960 | 1.09942 | 0.88798 | 1.32840 | 1.07292 | 1.23811 |
| Σ PPR | Σ NPR | Σ PPR/Σ NPR | Σ PP | Σ NP | f1/Σ PP |
| 2.06758 | 1.09942 | 1.88061 | 5.70439 | −2.62858 | 0.42948 |
| IN12/f | \|ODT\|% | \|TDT\|% | (TP1 + IN12)/TP2 | (TP3 + IN23)/TP2 | TP2/Σ TP |
| 0.23610 | 1.50942 | 0.87655 | 6.82402 | 6.82402 | 0.08435 |
| HOS | InTL | HOS/HOI | InS/HOS | InTL/HOS | Σ TP/InTL |
| 4.27500 | 3.26002 | 1.88492 | 0.98888 | 0.76258 | 0.78303 |
| HVT21 | HVT22 | HVT31 | HVT32 | HVT32/HOI | HVT32/HOS |
| 0.95954 | 0.85889 | 1.06345 | 1.15309 | 0.5084 | 0.2697 |

The results of the equations of the third embodiment based on Table 7 and Table 8 are listed in the following table:

| Values related to the inflection points of the fourth embodiment (Reference wavelength: 555 nm) | | | | | | |
|---|---|---|---|---|---|---|
| HIF111 | 0.47168 | HIF111/HOI | 0.20797 | SGI111 | 0.03221 | \|SGI111\|/(\|SGI111\| + TP1) | 0.03481 |
| HIF211 | 0.46060 | HIF211/HOI | 0.20309 | SGI211 | −0.19705 | \|SGI211\|/(\|SGI211\| + TP2) | 0.47785 |
| HIF221 | 0.47369 | HIF221/HOI | 0.20886 | SGI221 | −0.14125 | \|SGI221\|/(\|SGI221\| + TP2) | 0.39614 |
| HIF311 | 0.51240 | HIF311/HOI | 0.22593 | SGI311 | 0.06736 | \|SGI311\|/(\|SGI311\| + TP3) | 0.04456 |
| HIF321 | 0.57077 | HIF321/HOI | 0.25166 | SGI321 | 0.03111 | \|SGI321\|/(\|SGI321\| + TP3) | 0.02108 |

Fifth Embodiment

Figure 5A:
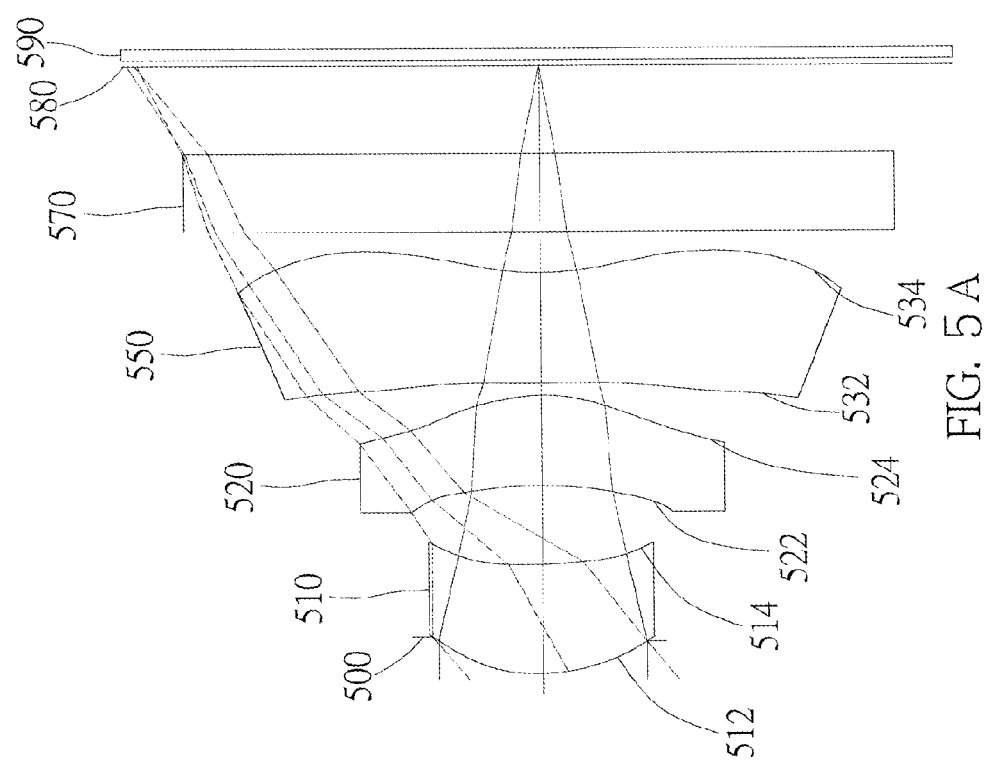
FIG. 5A is a schematic diagram of a fifth preferred embodiment of the present invention.
Figure 5:
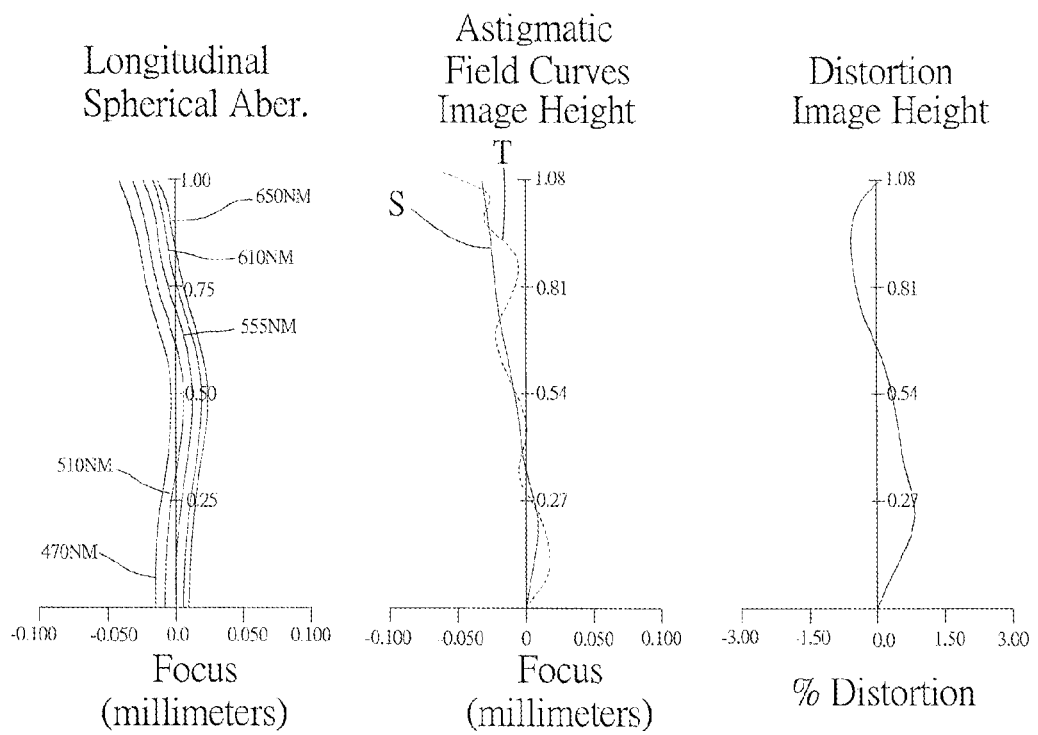
FIG. 5B shows curve diagrams of longitudinal spherical aberration, astigmatic field, and optical distortion of the optical image capturing system in the order from left to right of the fifth embodiment of the present application.
FIG. 5C shows a curve diagram of TV distortion of the optical image capturing system of the fifth embodiment of the present application.
Figure 5:
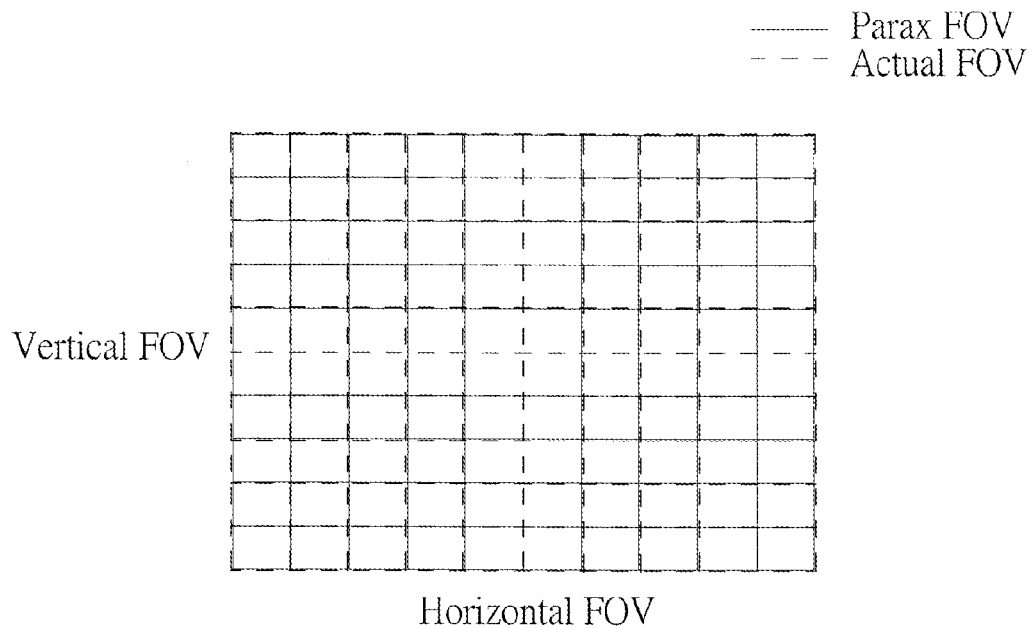

As shown in FIG. 5A and FIG. 5B, an optical image capturing system of the fifth preferred embodiment of the present invention includes, along an optical axis from an object side to an image side, an aperture 500, a first lens 510, a second lens 520, a third lens 530, an infrared rays filter 570, an image plane 580, and an image sensor 590.

The first lens 510 has positive refractive power, and is made of plastic. An object-side surface 512, which faces the object side, is a convex aspheric surface, and an image-side surface 514, which faces the image side, is a concave aspheric surface.

The second lens 520 has positive refractive power, and is made of plastic. An object-side surface 522 thereof, which faces the object side, is a concave aspheric surface, and an image-side surface 524 thereof, which faces the image side, is a convex aspheric surface. The image-side surface 524 has two inflection points.

The third lens 530 has negative refractive power, and is made of plastic. An object-side surface 532, which faces the object side, is a convex aspheric surface, and an image-side surface 534, which faces the image side, is a concave aspheric surface. The object-side surface 532 has three inflection points, and the image-side surface 534 has an inflection point.

The infrared rays filter 570 is made of glass, and between the third lens 530 and the image plane 580. The infrared rays filter 570 gives no contribution to the focal length of the system.

The parameters of the lenses of the fifth preferred embodiment are |f2|=1.387 mm; |f1|=1.452 mm; and |f2|<|f1|, where f1 is a focal length of the first lens 510 and f2 is a focal length of the second lens 520.

The optical image capturing system of the fifth preferred embodiment further satisfies TP2=0.242 mm and TP3=0.294 mm, where TP2 is a thickness of the second lens 520 on the optical axis, and TP3 is a thickness of the third lens 530 on the optical axis.

The optical image capturing system of the fifth preferred embodiment further satisfies ΣPP=f1+f2=2.83947 mm and f1/(f1+f2)=0.51149, where f1 is a focal length of the first lens 510, f2 is a focal length of the second lens 520, and ΣPP is a sum of the focal lengths of each positive lens. It is helpful to share the positive refractive power of the first lens 510 to the other positive lenses to avoid the significant aberration caused by the incident rays.

The optical image capturing system of the fifth preferred embodiment further satisfies ΣNP=f3, where ΣNP is a sum of the focal lengths of each negative lens.

The parameters of the lenses of the fifth embodiment are listed in Table 9 and Table 10.

TABLE 9 f = 1.340 mm; f/HEP = 2.46; HAF = 38.834 deg; tan(HAF) = 0.8050

| Surface | Radius of curvature (mm) | Thickness (mm) | Material | Refractive index | Abbe number | Focal length (mm) |
|---|---|---|---|---|---|---|
| 0 | Object | plane | 600 | | | |
| 1 | | plane | 0.102 | | | |
| 2 | Aperture | plane | −0.08312 | | | |
| 3 | 1$^{st}$ lens | 0.49281 | 0.29050 | plastic | 1.535 | 56.05 | 1.452 |
| 4 | | 1.06545 | 0.21304 | | | |
| 5 | 2$^{nd}$ lens | −0.96594 | 0.24240 | plastic | 1.535 | 56.05 | 1.387 |
| 6 | | −0.45709 | 0.03527 | | | |
| 7 | 3$^{rd}$ lens | 16.05009 | 0.29395 | plastic | 1.535 | 56.05 | −1.254 |
| 8 | | 0.64146 | 0.10900 | | | |
| 9 | Filter | plane | 0.21 | | | |
| 10 | | plane | 0.237 | | | |
| 11 | Image plane | plane | 0 | | | |

Reference wavelength: 555 nm

TABLE 10

Coefficients of the aspheric surfaces

| | Surface | | | | | |
|---|---|---|---|---|---|---|
| | 3 | 4 | 5 | 6 | 7 | 8 |
| k | 2.01824E−02 | 9.55965E+00 | −4.41020E+01 | −1.23809E+01 | −1.53530E+04 | −6.45641E+00 |
| A4 | 2.73779E−01 | 9.36063E−01 | −3.97557E+00 | −9.99887E+00 | −2.47339E+00 | −2.76537E+00 |
| A6 | −1.74068E+01 | 6.83878E+00 | 2.79159E+01 | 1.81093E+02 | 1.54556E+01 | 1.48443E+01 |
| A8 | 1.22816E+03 | −9.31427E+02 | 1.39349E+03 | −2.00026E+03 | −5.09297E+01 | −6.18536E+01 |
| A10 | −3.35987E+04 | 3.32362E+04 | −5.27979E+04 | 1.50954E+04 | 1.29379E+02 | 1.67430E+02 |
| A12 | 4.95528E+05 | −5.79704E+05 | 7.72144E+05 | −7.06870E+04 | −2.55156E+02 | −2.67187E+02 |
| A14 | −3.90842E+06 | 4.95867E+06 | −5.01063E+06 | 1.84693E+05 | 2.71245E+02 | 1.81948E+02 |
| A16 | 1.30544E+07 | −1.63270E+07 | 3.64087E+06 | −2.22351E+05 | −6.02299E+01 | 9.99102E+01 |
| A18 | 0.00000E+00 | 0.00000E+00 | 1.14092E+08 | 3.64341E+04 | −6.24963E+01 | −2.46729E+02 |
| A20 | 0.00000E+00 | 0.00000E+00 | −4.19185E+08 | 8.63213E+04 | −2.79496E+00 | 1.15666E+02 |

An equation of the aspheric surfaces of the fifth embodiment is the same as that of the first embodiment, and the definitions are the same as well.

The exact parameters of the fifth embodiment based on Table 9 and Table 10 are listed in the following table:

Fifth embodiment (Reference wavelength: 555 nm)

| InRS11 | InRS12 | InRS21 | InRS22 | InRS31 | InRS32 |
|---|---|---|---|---|---|
| 0.08800 | 0.05900 | −0.06967 | −0.12995 | −0.03679 | −0.04875 |

| InRSO | InRSI | Σ|InRS| | Σ|InRS|/InTL | Σ|InRS|/HOS |
|---|---|---|---|---|
| 0.19446 | 0.23771 | 0.43217 | 0.40196 | 0.26494 |

| |InRS31|/TP3 | |InRS32|/TP3 | (|InRS12| + |InRS21|)/IN12 | (|InRS22| + |InRS31|)/IN23 |
|---|---|---|---|
| 0.12516 | 0.16586 | 0.6040 | 4.7282 |

| (|InRS21| + |InRS22| + |InRS31| + |InRS32|)/InTL | (|InRS21| + |InRS22| + |InRS31| + |InRS32|)/HOS |
|---|---|

-continued

Fifth embodiment (Reference wavelength: 555 nm)

| | | | 0.26523 | | 0.17483 | |
|---|---|---|---|---|---|---|
| |f/f1| | |f/f2| | |f/f3| | |f1/f3| | |f1/f2| | |f2/f3| |
| 0.92259 | 0.96600 | 1.06842 | 0.86351 | 0.95506 | 0.90414 |

| Σ PPR | Σ NPR | Σ PPR/Σ NPR | Σ PP | Σ NP | f1/Σ PP |
|---|---|---|---|---|---|
| 1.88859 | 1.06842 | 1.76764 | 2.83947 | −1.2541 | 0.51149 |

| IN12/f | |ODT|% | |TDT|% | (TP1 + IN12)/TP2 | (TP3 + IN23)/TP2 | TP2/Σ TP |
|---|---|---|---|---|---|
| 0.15899 | 0.81360 | 0.57628 | 1.35819 | 1.35819 | 0.29316 |

| HOS | InTL | HOS/HOI | InS/HOS | InTL/HOS | Σ TP/InTL |
|---|---|---|---|---|---|
| 1.63116 | 1.07516 | 1.50754 | 0.94904 | 0.65914 | 0.76905 |

-continued

| Fifth embodiment (Reference wavelength: 555 nm) | | | | | |
|---|---|---|---|---|---|
| HVT21 | HVT22 | HVT31 | HVT32 | HVT32/ HOI | HVT32/ HOS |
| 0 | 0 | 0.07573 | 0.45922 | 0.42441 | 0.28153 |

The results of the equations of the third embodiment based on Table 9 and Table 10 are listed in the following table:

| Values related to the inflection points of the fifth embodiment (Reference wavelength: 555 nm) | | | | | | |
|---|---|---|---|---|---|---|
| HIF221 | 0.261825 | HIF221/HOI | 0.241982 | SGI221 | −0.0633236 | \|SGI221\|/(\|SGI221\| + TP2) | 0.20713 |
| HIF222 | 0.415454 | HIF222/HOI | 0.383969 | SGI222 | −0.113198 | \|SGI222\|/(\|SGI222\| + TP2) | 0.318336 |
| HIF311 | 0.04297 | HIF311/HOI | 0.039713 | SGI311 | 0.000048 | \|SGI311\|/(\|SGI311\| + TP3) | 0.000163 |
| HIF312 | 0.358423 | HIF312/HOI | 0.33126 | SGI312 | −0.0163614 | \|SGI312\|/(\|SGI312\| + TP3) | 0.052725 |
| HIF313 | 0.538607 | HIF313/HOI | 0.497788 | SGI313 | −0.0314042 | \|SGI313\|/(\|SGI313\| + TP3) | 0.096522 |
| HIF321 | 0.202546 | HIF321/HOI | 0.187196 | SGI321 | 0.0247325 | \|SGI321\|/(\|SGI321\| + TP3) | 0.077608 |

Sixth Embodiment

Figure 6A:
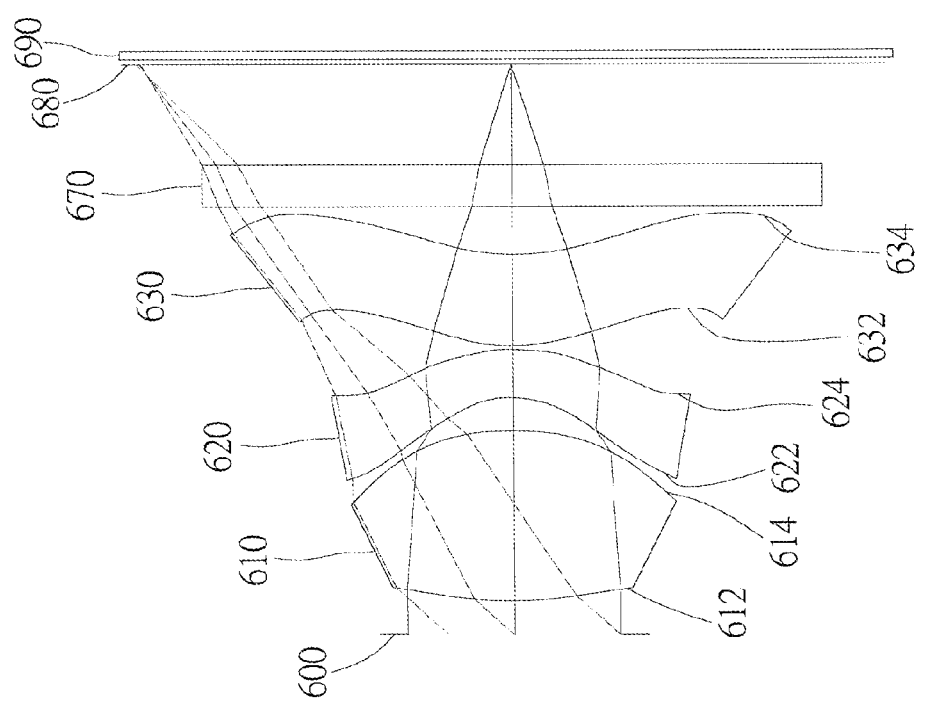
FIG. 6A is a schematic diagram of a sixth preferred embodiment of the present invention.
Figure 6:
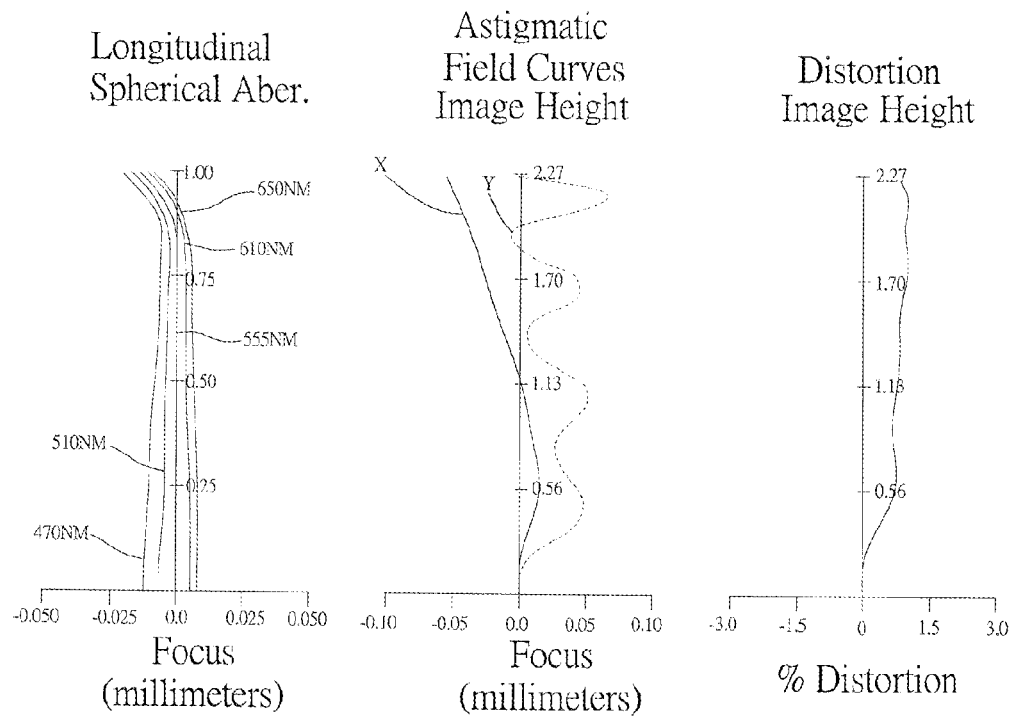
FIG. 6B shows curve diagrams of longitudinal spherical aberration, astigmatic field, and optical distortion of the optical image capturing system in the order from left to right of the sixth embodiment of the present application.
FIG. 6C shows a curve diagram of TV distortion of the optical image capturing system of the sixth embodiment of the present application.
Figure 6:
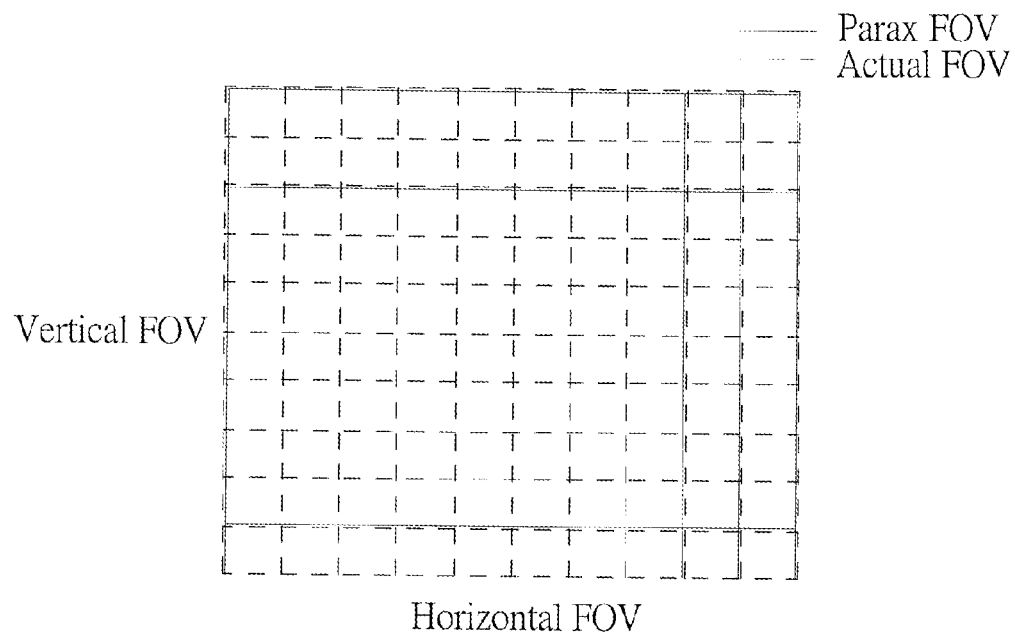

As shown in FIG. 6A and FIG. 6B, an optical image capturing system of the sixth preferred embodiment of the present invention includes, along an optical axis from an object side to an image side, an aperture 600, a first lens 610, a second lens 620, a third lens 630, an infrared rays filter 670, an image plane 680, and an image sensor 690.

The first lens 610 has positive refractive power, and is made of plastic. Both an object-side surface 612, which faces the object side, and an image-side surface 614, which faces the image side, are convex aspheric surfaces. The object-side surface 612 has an inflection point.

The second lens 620 has negative refractive power, and is made of plastic. An object-side surface 622 thereof, which faces the object side, is a concave aspheric surface, and an image-side surface 624 thereof, which faces the image side, is a convex aspheric surface. The object-side surface 622 and the image-side surface 624 each has an inflection point.

The third lens 630 has positive refractive power, and is made of plastic. An object-side surface 632, which faces the object side, is a convex aspheric surface, and an image-side surface 634, which faces the image side, is a concave aspheric surface. The object-side surface 632 and the image-side surface 634 each has an inflection point.

The infrared rays filter 670 is made of glass, and between the third lens 630 and the image plane 680. The infrared rays filter 670 gives no contribution to the focal length of the system.

The parameters of the lenses of the sixth preferred embodiment are |f2|=1.706 mm; |f1|=1.791 mm; and |f2|<|f1|, where f1 is a focal length of the first lens 610 and f2 is a focal length of the second lens 620.

The optical image capturing system of the sixth preferred embodiment further satisfies TP2=0.338 mm and TP3=0.646 mm, where TP2 is a thickness of the second lens 620 on the optical axis, and TP3 is a thickness of the third lens 630 on the optical axis.

The optical image capturing system of the sixth preferred embodiment further satisfies ΣPP=f1+f2=4.0907 mm and f1/(f1+f2)=0.4377, where f1 is a focal length of the first lens 610, f2 is a focal length of the second lens 620, and ΣPP is a sum of the focal lengths of each positive lens. It is helpful to share the positive refractive power of the first lens 610 to the other positive lenses to avoid the significant aberration caused by the incident rays.

The optical image capturing system of the sixth preferred embodiment further satisfies ΣNP=f2, where ΣNP is a sum of the focal lengths of each negative lens.

The parameters of the lenses of the sixth embodiment are listed in Table 11 and Table 12.

TABLE 11

| f = 2.334 mm; f/HEP = 1.8; HAF = 43.934 deg; tan(HAF) = 0.9635 | | | | | | |
|---|---|---|---|---|---|---|
| Surface | | Radius of curvature (mm) | Thickness (mm) | Material | Refractive index | Abbe number | Focal length (mm) |
| 0 | Object | plane | 6000 | | | | |
| 1 | Aperture | plane | 0.245 | | | | |
| 2 | 1st lens | 2.273980 | 1.187 | plastic | 1.544 | 56.09 | 1.791 |
| 3 | | −1.398300 | 0.234 | | | | |
| 4 | 2nd lens | −0.424004 | 0.338 | plastic | 1.642 | 22.46 | −1.706 |
| 5 | | −0.903506 | 0.025 | | | | |
| 6 | 3rd lens | 0.863493 | 0.646 | plastic | 1.642 | 22.46 | 2.300 |
| 7 | | 1.450258 | 0.326 | | | | |
| 8 | Filter | plane | 0.300 | | 1.517 | 64.13 | |
| 9 | | plane | 0.700 | | | | |

TABLE 11-continued f = 2.334 mm; f/HEP = 1.8; HAF = 43.934 deg; tan(HAF) = 0.9635

| Surface | Radius of curvature (mm) | Thickness (mm) | Material | Refractive index | Abbe number | Focal length (mm) |
|---|---|---|---|---|---|---|
| 10 | Image plane | | | | | |
| 11 | plane | | | | | |

Reference wavelength: 555 nm;
Position of blocking light: blocking at the third surface with optical diameter of 0.980 mm.

TABLE 12

| | Surface | | | | | |
|---|---|---|---|---|---|---|
| | 2 | 3 | 4 | 5 | 6 | 7 |
| k | −5.793298E+01 | −1.047222E+01 | −2.214799E+00 | −1.609407E+00 | −1.279016E+00 | −5.974452E+00 |
| A4 | 5.680888E−01 | −3.906179E−01 | 7.450205E−01 | 3.279455E−01 | −7.661874E−01 | 7.677749E−02 |
| A6 | −2.795876E+00 | −2.002429E−01 | −6.574821E+00 | −8.799316E−01 | 1.625831E+00 | −1.684057E−01 |
| A8 | 1.063340E+01 | −6.185052E−01 | 2.106066E+01 | 4.139075E−01 | −2.860513E+00 | 1.039362E−01 |
| A10 | −2.849055E+01 | 4.623426E+00 | −3.528569E+01 | 3.660140E+00 | 3.247167E+00 | −1.815849E−02 |
| A12 | 4.688333E+01 | −7.602169E+00 | 3.509519E+01 | −8.188023E+00 | −2.233218E+00 | −1.486964E−02 |
| A14 | −4.319063E+01 | 5.161391E+00 | −2.125517E+01 | 7.720120E+00 | 8.403317E−01 | 9.981753E−03 |
| A16 | 1.663827E+01 | −1.295352E+00 | 7.457267E+00 | −3.562241E+00 | −1.320160E−01 | −2.377427E−03 |
| A18 | 0.000000E+00 | 0.000000E+00 | −1.193774E+00 | 6.639228E−01 | −6.379427E−04 | 2.051198E−04 |

An equation of the aspheric surfaces of the fifth embodiment is the same as that of the first embodiment, and the definitions are the same as well.

The exact parameters of the fifth embodiment based on Table 11 and Table 12 are listed in the following table:

| Sixth embodiment (Reference wavelength: 555 nm) | | | | | |
|---|---|---|---|---|---|
| InRS11 | InRS12 | InRS21 | InRS22 | InRS31 | InRS32 |
| 0.09050 | −0.50284 | −0.57103 | −0.32116 | 0.17395 | 0.14969 |

| InRSO | InRSI | Σ|InRS| | Σ|InRS|/InTL | Σ|InRS|/HOS |
|---|---|---|---|---|
| 0.83547 | 0.97369 | 1.80916 | 0.74470 | 0.48183 |

| |InRS31|/TP3 | |InRS32|/TP3 | (|InRS12| + |InRS21|)/IN12 | (|InRS22| + |InRS31|)/IN23 |
|---|---|---|---|
| 0.26928 | 0.23173 | 4.5926 | 19.8042 |

| (|InRS21| + |InRS22| + |InRS31| + |InRS32|)/InTL | (|InRS21| + |InRS22| + |InRS31| + |InRS32|)/HOS |
|---|---|
| 0.50047 | 0.32380 |

| |f/f1| | |f/f2| | |f/f3| | |f1/f3| | |f1/f2| | |f2/f3| |
|---|---|---|---|---|---|
| 1.30350 | 1.36818 | 1.01473 | 1.28457 | 0.95272 | 1.34831 |

| Sixth embodiment (Reference wavelength: 555 nm) | | | | | |
|---|---|---|---|---|---|
| Σ PPR | Σ NPR | Σ PPR/|Σ NPR| | Σ PP | Σ NP | f1/Σ PP |
| 2.31823 | 1.36818 | 1.69439 | 4.09066 | −1.70591 | 0.43772 |

| IN12/f | |ODT|% | |TDT|% | (TP1 + IN12)/TP2 | (TP3 + IN23)/TP2 | TP2/Σ TP |
|---|---|---|---|---|---|
| 0.10018 | 1.08812 | 0.25449 | 1.98672 | 1.98672 | 0.15560 |

| HOS | InTL | HOS/HOI | InS/HOS | InTL/HOS | Σ TP/InTL |
|---|---|---|---|---|---|
| 3.75481 | 2.42939 | 1.65556 | 1.06530 | 0.64701 | 0.89346 |

| HVT21 | HVT22 | HVT31 | HVT32 | HVT32/HOI | HVT32/HOS |
|---|---|---|---|---|---|
| 0.00000 | 1.04568 | 1.06733 | 1.32084 | 0.5824 | 0.3518 |

The results of the equations of the third embodiment based on Table 11 and Table 12 are listed in the following table:

| Values related to the inflection points of the sixth embodiment (Reference wavelength: 555 nm) | | | | | |
|---|---|---|---|---|---|
| HIF111 | 0.5566 | HIF111/HOI | 0.2454 | SGI111 | 0.0630 | |SGI111|/(|SGI111| + TP1) | 0.0504 |

-continued

| Values related to the inflection points of the sixth embodiment (Reference wavelength: 555 nm) | | | | | | |
|---|---|---|---|---|---|---|
| HIF211 | 0.6152 | HIF211/HOI | 0.2713 | SGI211 | −0.3185 | \|SGI211\|/(\|SGI211\| + TP2) | 0.4853 |
| HIF221 | 0.6419 | HIF221/HOI | 0.2830 | SGI221 | −0.1904 | \|SGI221\|/(\|SGI221\| + TP2) | 0.3606 |
| HIF311 | 0.5698 | HIF311/HOI | 0.2512 | SGI311 | 0.1351 | \|SGI311\|/(\|SGI311\| + TP3) | 0.1730 |
| HIF321 | 0.7070 | HIF321/HOI | 0.3117 | SGI321 | 0.1430 | \|SGI321\|/(\|SGI321\| + TP3) | 0.1813 |

It must be pointed out that the embodiments described above are only some preferred embodiments of the present invention. All equivalent structures which employ the concepts disclosed in this specification and the appended claims should fall within the scope of the present invention.

What is claimed is:

1. An optical image capturing system, in order along an optical axis from an object side to an image side, comprising:
   a first lens having positive refractive power;
   a second lens having negative refractive power;
   a third lens having refractive power; and
   an image plane;
   wherein the optical image capturing system consists of the three lenses with refractive power; the third lens has positive refractive power; the third lens has an object-side surface, which faces the object side, and an image-side surface, which faces the image side, and both the object-side surface and the image-side surface of the third lens are aspheric surfaces;
   wherein the optical image capturing system satisfies:

$1.2 \leq f/HEP \leq 6.0$; $0.5 \leq HOS/f \leq 3.0$; $0 < \Sigma|InRS|/InTL \leq 3$;

where f is a focal length of the optical image capturing system; HEP is an entrance pupil diameter of the optical image capturing system; and HOS is a distance along the optical axis from the object-side surface of the first lens to the image plane; InTL is a distance between the object-side surface of the first lens and the image-side surface of the third lens along the optical axis; and $\Sigma|InRS|$ is a sum of absolute values of displacement for each lens with refractive power from a central point passed through by the optical axis to a point on the optical axis where a projection of a maximum effective semi diameter ends, wherein $\Sigma|InRS|=InRSO+InRSI$ while InRSO is a sum of absolute value of the displacement for each lens with refractive power from the central point on the object-side surface passed through by the optical axis to the point on the optical axis where the projection of the maximum effective semi diameter of the object-side surface ends, and InRSI is a sum of absolute value of the displacement for each lens with refractive power from the central point on the image-side surface passed through by the optical axis to the point on the optical axis where the projection of the maximum effective semi diameter of the image-side surface ends;
   wherein the optical image capturing system further satisfies:

0 mm<HOS≤7 mm.

2. The optical image capturing system of claim 1, wherein the optical image capturing system further satisfies:

\|TDT\|<60%;

where TDT is a TV distortion.

3. The optical image capturing system of claim 1, wherein the optical image capturing system further satisfies:

\|ODT\|≤50%;

where ODT is an optical distortion.

4. The optical image capturing system of claim 1, wherein the optical image capturing system further satisfies:

0 degree<HAF≤70 degrees;

where HAF is a half of a view angle of the optical image capturing system.

5. The optical image capturing system of claim 1, wherein the optical image capturing system further satisfies:

0.45≤InTL/HOS≤0.9.

6. The optical image capturing system of claim 1, wherein the optical image capturing system further satisfies:

0.45≤ΣTP/InTL≤0.95;

where ΣTP is a sum of central thicknesses of the lenses with refractive power on the optical axis.

7. The optical image capturing system of claim 4, further comprising an aperture and an image sensor on the image plane, wherein the optical image capturing system further satisfies:

0.5≤InS/HOS≤1.1;

where InS is a distance along the optical axis between the aperture and the image plane.

8. An optical image capturing system, in order along an optical axis from an object side to an image side, comprising:
   a first lens having positive refractive power;
   a second lens having negative refractive power;
   a third lens having refractive power; and
   an image plane;
   wherein the optical image capturing system consists of the three lenses with refractive power; at least two of the lenses from the first lens to the third lens each has at least an inflection point on at least a surface thereof; the third lens has positive refractive power; each of the first lens to the third lens has an object-side surface, which faces the object side, and an image-side surface, which faces the image side, and both the object-side surface and the image-side surface of the third lens are aspheric surfaces;
   wherein the optical image capturing system satisfies:

$1.2 \leq f/HEP 6.0$; $0.5 \leq HOS/f \leq 1.42$; and $0 < \Sigma|InRS|/InTL \leq 3$;

where f is a focal length of the optical image capturing system; HEP is an entrance pupil diameter of the optical image capturing system; and HOS is a distance along the optical axis from the object-side surface of the first lens to the image plane; InTL is a distance between the object-side surface of the first lens and the image-side surface of the third lens along the optical axis; and Σ|InRS| is a sum of absolute values of displacement for each lens with refractive power from a central point passed through by the optical axis to a point on the optical axis where a projection of a maximum effective semi diameter ends, wherein Σ|InRS|=InRSO+InRSI while InRSO is a sum of absolute value of the displacement for each lens with refractive power from the central point on the object-side surface passed through by the optical axis to the point on the optical axis where the projection of the maximum effective semi diameter of the object-side surface ends, and InRSI is a sum of absolute value of the displacement for each lens with refractive power from the central point on the image-side surface passed through by the optical axis to the point on the optical axis where the projection of the maximum effective semi diameter of the image-side surface ends;

wherein the optical image capturing system further satisfies:

0 mm<HOS≤7 mm.

9. The optical image capturing system of claim 8, wherein the third lens has positive refractive power; and at least one of the object-side surface and the image-side surface of the third lens has at least an inflection point.

10. The optical image capturing system of claim 8, wherein the optical image capturing system further satisfies:

0.5≤ΣPPR≤10;

where PPR is a ratio of the focal length of the optical image capturing system to a focal length fp of each of lenses with positive refractive power; ΣPPR is a sum of the PPRs.

11. The optical image capturing system of claim 8, wherein the optical image capturing system further satisfies:

|TDT|<60% and |ODT|≤50%;

where TDT is a TV distortion; and ODT is an optical distortion.

12. The optical image capturing system of claim 8, wherein the optical image capturing system further satisfies:

0 mm<Σ|InRS|≤10 mm.

13. The optical image capturing system of claim 8, wherein the optical image capturing system further satisfies:

0 mm<|InRS21|+|InRS22|+|InRS31|+|InRS32|≤8 mm;

where InRS21 is a displacement from a point on the object-side surface of the second lens passed through by the optical axis to a point on the optical axis where a projection of the maximum effective semi diameter of the object-side surface of the second lens ends; InRS22 is a displacement from a point on the image-side surface of the second lens passed through by the optical axis to a point on the optical axis where a projection of the maximum effective semi diameter of the image-side surface of the second lens ends; InRS31 is a displacement from a point on the object-side surface of the third lens passed through by the optical axis to a point on the optical axis where a projection of the maximum effective semi diameter of the object-side surface of the third lens ends; InRS32 is a displacement from a point on the image-side surface of the third lens passed through by the optical axis to a point on the optical axis where a projection of the maximum effective semi diameter of the image-side surface of the third lens ends.

14. The optical image capturing system of claim 13, wherein the optical image capturing system further satisfies:

0<(|InRS21|+|InRS22|+|InRS31|+|InRS32|)/InTL≤2.

15. The optical image capturing system of claim 8, wherein the optical image capturing system further satisfies:

0<(|InRS21|+|InRS22|+|InRS31|+|InRS32|)/HOS≤2;

where InRS21 is a displacement along the optical axis from a point on the object-side surface of the second lens passed through by the optical axis, through which the optical axis passes, to a point on the optical axis where a projection of the maximum effective semi diameter of the object-side surface of the second lens ends; InRS22 is a displacement along the optical axis from a point on the image-side surface of the second lens passed through by the optical axis, through which the optical axis passes, to a point on the optical axis where a projection of at the maximum effective semi diameter of the image-side surface of the second lens ends; InRS31 is a displacement along the optical axis from a point on the object-side surface of the third lens passed through by the optical axis, through which the optical axis passes, to a point on the optical axis where a projection of the maximum effective semi diameter of the object-side surface of the third lens ends; InRS32 is a displacement along the optical axis from a point on the image-side surface of the third lens passed through by the optical axis, through which the optical axis passes, to a point on the optical axis where a projection of the maximum effective semi diameter of the image-side surface of the third lens ends.

16. The optical image capturing system of claim 8, wherein the optical image capturing system further satisfies:

0<f1/ΣPP≤0.8;

where f1 is a focal length of the first length; and ΣPP is a sum of focal lengths of each lens with positive refractive power.

17. An optical image capturing system, in order along an optical axis from an object side to an image side, comprising:

a first lens having positive refractive power, wherein the first lens has an object-side surface, which faces the object side, and an image-side surface, which faces the image side, thereof; and an area of the image-side surface of the first lens, where is close to the optical axis, is convex;

a second lens having negative refractive power;

a third lens having refractive power, wherein the third lens has at least an inflection point on at least one of an object-side surface, which faces the object side, and an image-side surface, which faces the image side, thereof; and an image plane;

wherein the optical image capturing system consists of the three lenses having refractive power; the first lens and the second lens each has an at least an inflection point on at least a surface thereof; the first lens has an object-side surface, which faces the object side, and an image-side surface, which faces the image side; both the object-side surface and the image-side surface of the first lens are aspheric surfaces, and both the object-side surface and the image-side surface of the third lens are aspheric surfaces;
wherein the optical image capturing system satisfies:

$1.2 \leq f/HEP \leq 3.0$; $0.4 \leq |\tan(HAF)| \leq 1.5$; $0.5 \leq HOS/f \leq 2.5$; $|TDT| < 60\%$; $|ODT| \leq 50\%$; and $0 < \Sigma|InRS|/InTL \leq 3$;

where f is a focal length of the optical image capturing system; HEP is an entrance pupil diameter of the optical image capturing system; HAF is a half of a view angle of the optical image capturing system; HOS is a distance in parallel with along the optical axis between an object-side surface, which face the object side, of the first lens and the image plane; TDT is a TV distortion; ODT is an optical distortion; InTL is a distance between the object-side surface of the first lens and the image-side surface of the third lens along the optical axis; and $\Sigma|InRS|$ is a sum of absolute value of a displacement for each lens with refractive power from a central point passed through by the optical axis to a point on the optical axis where a projection of at the maximum effective semi diameter ends, wherein $\Sigma|InRS|=InRSO+InRSI$ while InRSO is a sum of absolute values of the displacement for each lens with refractive power from the central point on the object-side surface passed through by the optical axis to the point on the optical axis where the projection of the maximum effective semi diameter of the object-side surface ends, and InRSI is a sum of absolute value of the displacement for each lens with refractive power from the central point on the image-side surface passed through by the optical axis to the point on the optical axis where the projection of the maximum effective semi diameter of the image-side surface ends;
wherein the optical image capturing system further satisfies:

$0 \text{ mm} < HOS \leq 7 \text{ mm}$.

18. The optical image capturing system of claim 17, wherein the optical image capturing system further satisfies:

$0 < f1/\Sigma PP \leq 0.8$;

where f1 is a focal length of the first length; and $\Sigma PP$ is a sum of focal lengths of each lens with positive refractive power.

19. The optical image capturing system of claim 17, wherein the optical image capturing system further satisfies:

$0 \text{ mm} < |InRS21|+|InRS22|+|InRS31|+|InRS32| \leq 8 \text{ mm}$;

where InRS21 is a displacement from a point on the object-side surface of the second lens passed through by the optical axis to a point on the optical axis where a projection of the maximum effective semi diameter of the object-side surface of the second lens ends; InRS22 is a displacement from a point on the image-side surface of the second lens passed through by the optical axis to a point on the optical axis where a projection of the maximum effective semi diameter of the image-side surface of the second lens ends; InRS31 is a displacement from a point on the object-side surface of the third lens passed through by the optical axis to a point on the optical axis where a projection of the maximum effective semi diameter of the object-side surface of the third lens ends; InRS32 is a displacement from a point on the image-side surface of the third lens passed through by the optical axis to a point on the optical axis where a projection of the maximum effective semi diameter of the image-side surface of the third lens ends.

20. The optical image capturing system of claim 19, wherein the optical image capturing system further satisfies:

$0 < (|InRS21|+|InRS22|+|InRS31|+|InRS32|)/InTL \leq 2$.

21. The optical image capturing system of claim 19, further comprising an aperture and an image sensor on the image plane, wherein the optical image capturing system further satisfies:

$0.5 \leq InS/HOS \leq 1.1$;

where InS is a distance along the optical axis between the aperture and the image plane.

* * * * *